United States Patent
Lo

(10) Patent No.: US 8,018,658 B2
(45) Date of Patent: *Sep. 13, 2011

(54) FLUIDIC ADAPTIVE LENS SYSTEMS AND METHODS

(75) Inventor: Yu-Hwa Lo, San Diego, CA (US)

(73) Assignee: The Regents of the Univeristy of California, Oakland, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 12/256,961

(22) Filed: Oct. 23, 2008

(65) Prior Publication Data

US 2010/0039709 A1     Feb. 18, 2010

Related U.S. Application Data

(63) Continuation-in-part of application No. 11/683,141, filed on Mar. 7, 2007, now Pat. No. 7,453,646, which is a continuation-in-part of application No. 10/599,486, filed as application No. PCT/US2005/010948 on Mar. 31, 2005, now Pat. No. 7,675,686.

(60) Provisional application No. 60/558,293, filed on Mar. 31, 2004.

(51) Int. Cl.
G02B 3/12 (2006.01)
G02B 1/06 (2006.01)

(52) U.S. Cl. ........................................ 359/665; 359/886

(58) Field of Classification Search .......... 359/665–667, 359/886

See application file for complete search history.

(56) References Cited

U.S. PATENT DOCUMENTS

| | | | |
|---|---|---|---|
| 4,261,655 A | 4/1981 | Honigsbaum | |
| 5,446,591 A | 8/1995 | Medlock | |
| 5,973,852 A | 10/1999 | Task | |
| 6,081,388 A | 6/2000 | Widl | |
| 6,188,526 B1 | 2/2001 | Sasaya et al. | |
| 6,369,954 B1 | 4/2002 | Berge et al. | |
| 6,618,208 B1 | 9/2003 | Silver | |
| 6,737,646 B2 | 5/2004 | Schwartz | |
| 6,891,682 B2 | 5/2005 | Aizenberg | |
| 6,999,238 B2 | 2/2006 | Glebov | |
| 7,256,943 B1* | 8/2007 | Kobrin et al. | 359/666 |
| 7,443,596 B1 | 10/2008 | Berge | |
| 7,453,646 B2* | 11/2008 | Lo | 359/665 |
| 2001/0017985 A1 | 8/2001 | Tsuboi et al. | |
| 2002/0176148 A1 | 11/2002 | Onuki et al. | |

(Continued)

FOREIGN PATENT DOCUMENTS

GB     1 327 503 A     8/1973

(Continued)

OTHER PUBLICATIONS

Data Sheet for Optical Fluid LS-5257, printed on Mar. 16, 2010 from http://www.focenter.com.*

(Continued)

Primary Examiner — Darryl J Collins
(74) Attorney, Agent, or Firm — Perkins Coie LLP

(57) ABSTRACT

Fluidic adaptive lens devices, and systems employing such lens devices, along with methods of fabricating and operating such lens devices, are disclosed. In one embodiment, a lens material is optimally selected to provide one or more desired characteristics for a variety of applications related to adaptive lens devices. In another embodiment, a fluidic medium is optimally chosen to provide one or more desired characteristics for a variety of applications related to adaptive lens devices.

24 Claims, 15 Drawing Sheets

U.S. PATENT DOCUMENTS

2003/0095336 A1  5/2003  Floyd

FOREIGN PATENT DOCUMENTS

| | | |
|---|---|---|
| GB | 2 184 562 | 6/1987 |
| JP | 2002-169005 | 6/2002 |
| WO | 2000/058763 | 10/2000 |
| WO | 2003/069380 | 8/2003 |

OTHER PUBLICATIONS

Zhang, D.-Y., et al., "Fluidic Adaptive Lends with High Focal Length Tunability," Applied Physics Letters, 82(19):3171-3172, May 2003.

Jo, B.-H., et al., "Three-Dimensional Micro-Channel Fabrication in Polydimethylsiloxane (PDMS) Elastomer" Journal of Microelectromechanical Systems, 9(1):76-81, Mar. 2000.

\* cited by examiner

FLUIDIC ADAPTIVE LENS SYSTEMS AND METHODS

PRIORITY

This application is a continuation-in-part of U.S. patent application Ser. No. 11/683,141 entitled "Fluidic Adaptive Lens Systems and Methods" filed on Mar. 7, 2007 now U.S. Pat. No. 7,453,646, which is a continuation-in-part of U.S. patent application Ser. No. 10/599,486 filed on Mar. 3, 2005, now U.S. Pat. No. 7,675,686 which is the U.S. national phase patent application of International Application No. PCT/US05/10948 entitled "Fluidic Adaptive Lens" filed on Mar. 31, 2005, and which claims priority to U.S. provisional application No. 60/558,293 entitled "Fluidic Adaptive Lens" filed on Mar. 31, 2004, each of which is hereby incorporated by reference herein.

STATEMENT REGARDING FEDERALLY SPONSORED RESEARCH OR DEVELOPMENT

This invention was made with United States Government support awarded by the following agencies: Defense Advanced Research Projects Agency (DARPA) Grant No. F49620-02-1-0426; and Air Force Office of Scientific Research (AFOSR) Grant No. F49620-02-1-0426. The United States Government has certain rights in this invention.

FIELD OF THE INVENTION

The present invention relates to optical lenses. In particular, but not by way of limitation, the present invention relates to vision correction lenses, microscopes, zoom lens systems, and cameras, such as are employed in various optical systems.

BACKGROUND OF THE INVENTION

Optical lenses are employed in a variety of devices for many purposes such as modifying focus and magnification. Many conventional devices that employ optical lenses use lenses that are made from solid materials, such that the optical properties of the lenses (e.g., their focal distances) remain constant or nearly constant over time. For example, eyeglasses used for vision correction typically are made of solid materials such as glass and plastic. Similarly, cameras and other optical systems such as microscopes, video monitors, video recorders, copy machines, scanners, etc., commonly employ solid lenses.

Although lenses made from solid materials generally maintain their optical properties over time, the use of such lenses also has numerous disadvantages. With respect to vision correction lenses, for example, the power of vision correction is fixed at the time of fabrication of the lenses. As a consequence, today's eyeglass lenses often cannot be mass produced at low cost because the lenses are specially fabricated for each and every patient. Since each patient has his/her unique power requirement for eye correction, the patient has to see an ophthalmologist or optometrist to measure his/her eye correction power first before having the vision correction lenses fabricated. In addition, machining glass or plastic material to the precise shape of a lens according to a prescription is, by itself, a relatively high-cost and low throughput process. Often, it takes several days or even weeks for patients to receive a new pair of eyeglasses. In comparison with certain off-the-shelf vision products such as sunglasses, vision-correcting eyeglasses designed and fabricated using current technology are particularly expensive and complicated to manufacture.

Further, vision correction lenses used in today's eyeglasses do not have the flexibility to handle various situations with which wearers are often confronted. For example, the optimal eye correction for a given individual frequently varies depending upon a variety of factors, such as the person's age, the person's lifestyle, and various practical circumstances. Consequently, an adult typically needs to replace his or her eye correction lenses every few years. For juveniles or adolescents, updating of vision correction eyeglasses often is required more frequently than for adults.

For certain persons, particularly persons in their 50s and over, the vision correction that is needed for viewing near objects can be very different from the vision correction that is needed for viewing distant objects. To provide different levels of vision correction via a single pair of eyeglasses, many of today's eyeglasses employ bifocal lenses (or even tri-focal or otherwise multi-focal lenses), in which different sections of a given lens provide different optical properties. Yet such bifocal lenses offer at best an inconvenient solution to the problem of how to provide varying levels of vision correction on a single pair of eyeglasses. Traditionally, bifocal lenses are formed from pairs of lens portions that are positioned or fused adjacent to one another along a midline of the overall lens. Because the midline between the lens portions is a perceptible boundary between the lens portions, such lenses are often cosmetically undesirable.

Although newer bifocal lenses are available that are not as cosmetically undesirable, insofar as the lenses are graded such that there is only a gradual change of correction power from region to region on the lens and such that a clear boundary separating different regions of the lens does not exist, such newer bifocal lenses nevertheless share other problems with traditional bifocal lenses. In particular, because different portions of the lenses have different vision correction characteristics, the wearer's field-of-view at any given time or circumstance via the lenses is still compromised insofar as only certain portions of the lenses provide the appropriate optical characteristics for the wearer at that time/circumstance.

Additionally, while many persons do not require bifocal lenses, these persons can nevertheless prefer that their eyeglasses provide different amounts of vision correction in different situations. For example, the preferred amount of vision correction for a person when driving a car or watching a movie can differ from the preferred amount of vision correction for that person when reading a book or working in front of a computer screen.

For at least these reasons, therefore, it is apparent that the use of solid lenses with fixed optical properties in eyeglasses is disadvantageous in a variety of respects. Yet the disadvantages associated with using solid lenses with fixed optical properties are not limited to the disadvantages associated with using such lenses in eyeglasses/eyewear. Indeed, the use of solid lenses with fixed properties in a variety of devices such as cameras, microscopes, video monitors, video recorders, copy machines, scanners, etc. also presents similar disadvantages.

Further, the use of solid lenses with fixed optical properties entails additional disadvantages in systems that employ combinations of lenses that interact with one another to provide overall optical properties. Such systems include, for example, zoom lens systems in which two or more optical lenses of fixed optical properties are moved relative to one another to change optical properties of the overall combination of lenses forming the zoom lens. Because the optical properties of the individual lenses used in such systems are fixed, the overall optical properties of the combinations of lenses depend upon other factors, particularly the relative positioning of the individual lenses. Consequently, to provide the desirable features and capabilities associated with systems such as zoom lens systems, complicated and expensive mechanical and/or other components and techniques must be employed to achieve the desired effects.

In particular with respect to zoom lens systems, conventional systems with zooming capabilities are typically more expensive and often more bulky/heavy than systems without such capabilities. The most important figure of merit for zoom lenses is the zoom ratio. The higher the zoom ratio is, the more costly the system becomes. A typical camera has an optical zoom ratio of about 3, and some high-end imaging systems have a zoom ratio of greater than 10. Currently, all optical zoom lenses achieve zoom-in and zoom-out functions by changing the distance(s) between the individual lenses forming the overall zoom lens. This involves high-precision mechanical motions of the lenses over a typical range of several centimeters. To provide highly-precise, reliable relative movement of the lenses typically requires a mechanical system that is complicated, slow, bulky and expensive.

The need to vary lens distance to achieve zooming has become a roadblock for incorporating zooming features into many new and emerging applications. Many modern "electronic gadgets" including cell phones, personal digital assistants (PDAs), and notebook computers are equipped with CCD or CMOS cameras. Implementation of cameras into such gadgets has evolved from being a novelty to being a standard feature, and many such gadgets now support imaging-related functions that involve not just imaging but also recording, videophone capabilities, and video conferencing. Yet conventional zoom lenses are difficult to incorporate into these small electronic gadgets and their optical devices.

Therefore, it would be advantageous if one or more new types of lenses and/or lens systems could be developed that alleviated the disadvantages associated with using solid lenses having fixed optical properties as discussed above. In particular, it would be advantageous if a new type of lens or lens system could be developed for implementation in eyeglasses that made it possible to easily and inexpensively adjust optical characteristics of the eyeglasses without entirely replacing the lenses. It would further be advantageous if the optical characteristics of the lenses could be flexibly varied over a wide spectrum, rather than simply to a limited number of discrete levels. It additionally would be advantageous if variations in the optical properties of a lens could be applied to the entire lens, so that, for example, variations in the optical properties of the lens would apply to an entire range of vision of a wearer of eyeglasses employing the lens, rather than merely a portion of that range of vision.

It further would be advantageous if the new type of lens or lens system could also or alternatively be implemented in other systems that employ lenses such as cameras, microscopes, video monitors, video recorders, optical recording mechanisms, surveillance equipment, inspection equipment, agile imaging equipment, target tracking equipment, copy machines, scanners, etc. It additionally would be advantageous if the new type of lens or lens system could be implemented in zoom lens systems in a manner that reduced the need for complicated mechanical systems for controlling relative positioning of multiple lenses within the zoom lens systems. It also would be advantageous if a zoom lens system employing the new type of lens or lens system could be compactly implemented on one or more types of physically small "electronic gadgets" such as cell phones, personal digital assistants (PDAs), or notebook computers.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present inventor has recognized that many of the above-mentioned disadvantages associated with conventional eyeglasses and optical systems, including systems employing multiple lenses such as zoom lens systems, can be alleviated or eliminated if the eyeglasses or optical systems employ lenses that are variable or adaptive in terms of their optical properties. The present inventor further has discovered that lenses having adaptive optical properties can be formed through the use of one or more optically transparent flexible diaphragms/membranes that respectively separate pairs of fluidic media. By appropriately varying one or more of the pressures of the fluidic media, which results in changes in the positioning of the membranes and the amounts of one or more of the respective fluidic media through which light passes, the optical properties of the lenses can be varied.

In particular, the present invention in at least some embodiments can provide a lens device that includes a first partition that is flexible and optically transparent and a second partition that is coupled to the first partition, where at least a portion of the second partition is optically transparent, and where a first cavity is formed in between the first partition and the second partition. The lens device can further include a first fluidic medium positioned within the cavity, the fluidic medium also being optically transparent, and a first component capable of controlling a parameter of the fluidic medium. When the parameter of the fluidic medium changes, the first partition flexes and an optical property of the lens is varied.

In at least some embodiments, the present invention can also provide a multi-lens apparatus comprising a first fluidic adaptive lens, a second fluidic adaptive lens, and an intermediate structure coupling the first and second fluidic adaptive lenses, where the intermediate structure is at least partly optically transparent.

Additionally, in at least some embodiments, the present invention can provide a method of fabricating a fluidic adaptive lens device. The method can include providing a first structure having a first cavity, where the first cavity is only partially enclosed by the first structure, and attaching a first flexible layer and the first structure to one another in a manner that substantially encloses the first cavity. The first cavity is capable of being filled with a first fluid so that the first structure, first flexible layer, and first fluid interact to form the fluidic adaptive lens device.

Also, in at least some embodiments, the present invention can provide a method of operating a lens device. The method can include providing a lens structure including a flexible layer and a rigid structure coupled to one another and forming a cavity, and adjusting a fluid pressure of fluid within the cavity so as to adjust a flexure of the flexible layer.

The present inventor has recognized the desirability of providing optimized components and/or materials for use in fluidic adaptive lenses. More particularly, the present inventor has recognized the desirability of providing fluidic adapted lenses with optimally selected lens fluid that provides certain desired characteristics including, for example, a relatively high index of refraction, a low attenuation over the wavelength spectrum of interest, a relatively high transmission over a relatively large wavelength spectrum of interest, a relatively high transmission over a relatively small wavelength spectrum of interest, a wide range of operable temperature, a wide range of storage temperature, an extremely low (nearly zero) vapor pressure, and/or a chemical stability with lens membrane and chamber material.

The present inventor has further recognized the desirability of providing fluidic adapted lenses with optimally selected lens membrane material that provides certain desired characteristics including, for example, high flexibility and/or reasonably low spring constant.

Therefore, in at least some embodiments, the present invention relates to a lens device that includes a lens chamber including a plurality of surfaces, where at least one surface of the plurality of surfaces is optically transparent, and a lens membrane coupled to the lens chamber, where at least a portion of the lens membrane is flexible and optically transparent, and where the lens membrane and the lens chamber define a first cavity. The lens device further includes a fluidic medium positioned within the first cavity, the fluidic medium also being optically transparent, and a control device capable of controlling a parameter of the fluidic medium. In at least some such embodiments, the fluidic medium can be/include any of a variety of fluids including, for example, polyphenyl ether ("PPE"), thioethers benzene, lens fluid LS5257 available from Nusil Technology LLC of Carpinteria, Calif., a lens oil, a fluid containing at least one phenyl group, and/or a fluid having a molar molecular weight greater than 200 g.

Also, in at least some embodiments, the present invention relates to a method of fabricating a fluidic adaptive lens device. The method includes providing a lens chamber including a plurality of surfaces, where at least one surface of the plurality of surfaces is optically transparent, and affixing a lens membrane to the lens chamber, where at least a portion of the lens membrane is flexible and optically transparent and where the lens membrane and the lens chamber define a first cavity. The method additionally includes positioning a fluidic medium within the first cavity, where the fluidic medium is optically transparent, and providing a control device capable of controlling a parameter of the fluidic medium. Again, the fluidic medium can take any of a variety of forms depending upon the embodiment.

Further, in at least some embodiments, the present invention relates to a lens system. The lens system includes first and second lens structures. Each of the first and second lens structures includes a respective lens chamber including a respective plurality of surfaces, where at least one surface of the respective plurality of surfaces of each respective lens chamber is optically transparent. Also, each of the first and second lens structures includes a respective lens membrane coupled to the respective lens chamber of each respective lens structure, where at least a portion of each respective lens membrane is flexible and optically transparent, and where the respective lens membrane and the respective lens chamber of each respective lens structure together define a respective cavity. Further, the lens system includes at least one fluidic medium positioned within the cavities of the first and second lens structures, the at least one fluidic medium also being optically transparent, and means for controlling at least one parameter of the at least one fluidic medium.

As previously stated, the aforementioned embodiments and implementations, and embodiments described below, are for illustration purposes only. Numerous other embodiments, implementations, and details of the invention are easily recognized by those of skill in the art from the following description and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying drawings wherein:

DETAILED DESCRIPTION

Embodiments of the present invention concern the design and construction of fluidic adaptive lenses, as well as the use of one or more such lenses in a variety of environments and applications. Indeed, embodiments of the present invention include a variety of applications and environments in which one or more fluidic adaptive lenses can be employed including, for example, eyeglasses, zoom lens systems, microscopes, video monitors, video recorders, optical recording mechanisms, bar-code readers, systems with magnifying functions, surveillance equipment, security equipment, inspection equipment, agile imaging equipment, target tracking equipment, copy machines, scanners, cell phones, personal digital assistants (PDAs), notebook computers, telescopes, magnifying glasses, optometrist equipment, surgical equipment, biometric equipment such as iris scanning equipment and fingerprint-scanning equipment, and other devices that require lenses.

At least some embodiments of the present invention relate generally to the design and implementation of fluidic adaptive lenses, independent of any particular application of such lenses. The present invention is intended to encompass a variety of different lenses, lens structures and lens systems that employ one or more fluidic adaptive lenses that are variable in terms of optical characteristics, including a variety of lens types such as convex, concave, convex-concave, positive or negative meniscus, plano-convex, plano-concave, bicovex and biconcave lenses.

Figure 1A:
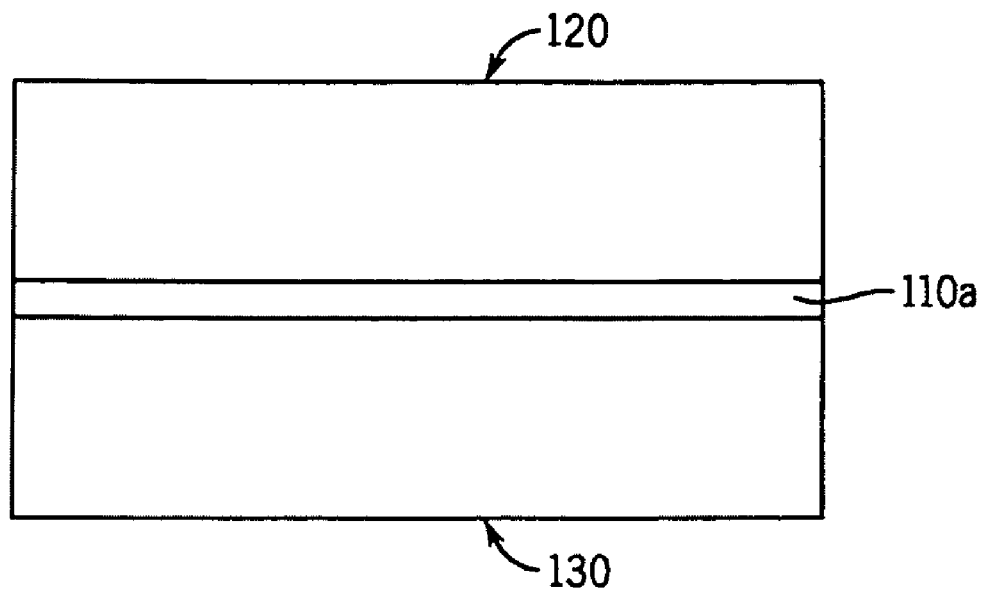
FIG. 1a shows, in simplified schematic form, a cross-sectional view of one embodiment associated with a fluidic adaptive lens of the present invention.
Figure 1B:
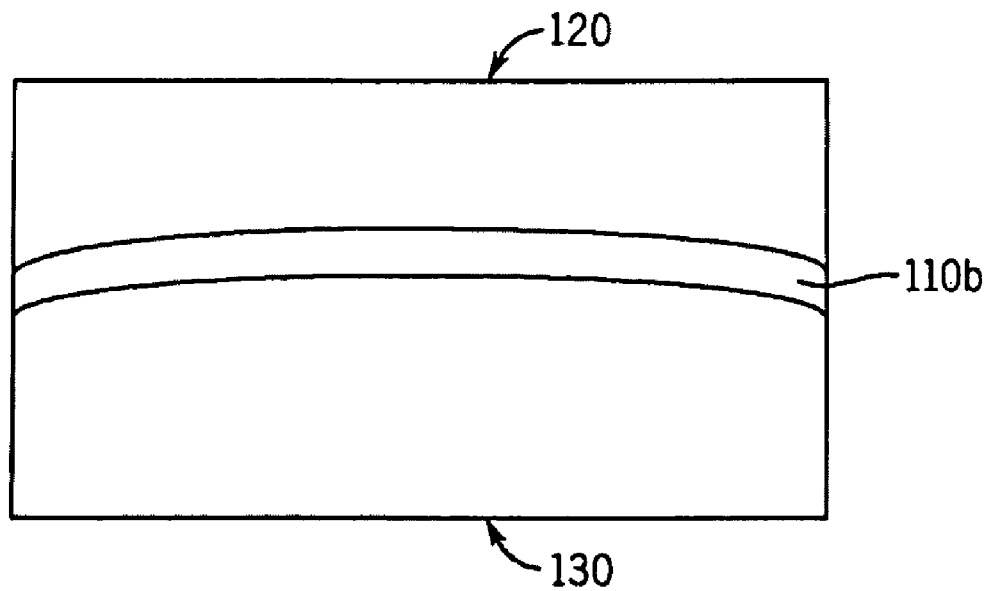
FIG. 1b shows, in simplified schematic form, a cross-sectional view of one embodiment associated with a fluidic adaptive lens of the present invention.

Referring to FIGS. 1a and 1b, exemplary fluidic adaptive lenses capable of being implemented in a variety of environments and applications such as those described above are shown in schematic form. FIG. 1a more particularly shows a cross-sectional view of one embodiment of a lens structure that can be implemented in any of the variety of environments and applications described and/or referenced above. As shown, FIG. 1a comprises a lens membrane 110a and two fluidic mediums 120 and 130. The lens membrane 110a is shown in a stress-free state. That is, the lens membrane 110a is not shown to be elastically deformed by the fluidic medium(s) 120 and/or 130.

Turning to FIG. 1b, the exemplary fluidic adaptive lens of FIG. 1a is shown in a different configuration, in which the lens membrane, now referred to as a lens membrane 110b, is elastically deformed. The deformation of the lens membrane 110b is achieved by applying fluidic pressure via the fluidic medium 130 and/or releasing fluidic pressure via the fluidic medium 120. One of skill in the art will recognize alternative deformations than that shown in FIG. 1b, such as those listed above.

Lens Membrane

At least some aspects of the present invention pertain to the deformation of lens membranes such as the lens membrane 110b of FIG. 1b. To achieve desired deformation, the elastic properties of a lens membrane can be of significance. Depending upon the embodiment, the deformation of a lens membrane such as the lens membrane 110b can occur via any number of methods and systems including, for example, one or more pressure vessels (not shown) that drive the fluid medium(s) 120 and/or 130 into and out of one or more lens chamber(s) (not shown). Further for example, when a pressure vessel drives the fluidic medium 130 into a lens chamber containing that fluidic medium, the lens membrane 110b then expands to an elastically deformed lens profile state, such as the state shown in FIG. 1b. When the pressure vessel drives the fluidic medium 130 out of the lens chamber, the lens membrane 110b returns to its stress-free state, such as the state shown in FIG. 1a.

Various methods are possible for controlling the deformation of a lens membrane such as the lens membrane 110b via one or more pressure vessels. For example, a valve (not shown) can be used in conjunction with a pressure vessel to regulate the transfer of fluid into and out of a lens chamber.

Other devices that can be employed in conjunction with a pressure vessel include, for example, a piezoelectric motor (not shown), a bellow (not shown), a solenoid switch (not shown), and other like devices capable of regulating deformation of the lens membrane 110b. The present invention is intended to encompass, in various embodiments, any of these methods and devices, as well as others that are known to those of skill in the art.

In at least some embodiments, the lens membrane 110b is designed to possess not only high flexibility but also a reasonably low spring constant so that the size, cost, and/or power consumption of the pressure vessel and any related control device are not limiting factors.

In at least some embodiments of fluidic adaptive lenses capable of being used in compact fluidic zoom lens systems, an attractive material for a lens membrane such as the lens membrane 110b is polydimethylsiloxane ("PDMS"). Certain PDMS materials (e.g., Sylgard 184, Sylgard 182, Gelest 1.41, Gelest 1.42, etc.) are optically transparent and can be stretched to 300-700% of their stress-free states. Furthermore, the Young's modulus for certain PDMS materials is on the order of 1 MPa. For example, a 4-5 mm diameter lens with a 60-100 μm thick PDMS lens membrane made from Dow Corning Sylgard 1:10 (available from the Dow Corning Corp. of Midland, Mich.) requires less than ±40 grams (~0.4 Newton) of force to achieve the full tuning range of the focal distance. The required force for a full tuning range of focal distance is several times lower for PDMS than other types of optically transparent elastomer such as polyurethane. Thus, in at least some circumstances, an optically transparent elastomer with a low Young's modulus such as PDMS is a favorable choice for small form factor tunable lens systems in accordance with at least some embodiments of the present invention.

In addition to the characteristics discussed above, in at least some embodiments, the material of a lens membrane such as the lens membrane 110b is designed to possess a relatively high resistance to both UV radiation under sun light and water condensation when temperature drops below the dew point. PDMS materials can satisfy these criteria.

In alternate embodiments of the present invention, materials other than PDMS materials can be employed. For example, lens membranes such as the lens membrane 110b can also be formed of silicone rubber. Preferably, the silicone rubber would be selected to have transparent or optically clear characteristics.

Fluidic Medium

A variety of different fluidic media can be utilized depending upon the embodiment including, for example, water, methanol, lens oil, saline, and air. At least some additional aspects of the present invention pertain to the fluidic medium(s) (e.g., the fluidic medium(s) 120 and/or 130), which are designed to possess not only desirable optical properties, but also both material and process compatibility with the lens membrane(s) with which they interact (e.g., the lens membrane 110b). In at least some embodiments, fluidic media with one or more of the following characteristics are preferred: a relatively high index of refraction (e.g., to achieve high lens power and wide tuning range); low attenuation over the wavelength spectrum of interest (e.g., wavelength spectra of 430-700 nm or 400-1600 nm); a wide range of operable temperatures (e.g. −20 degrees C. to >60 degrees C.); a wide range of storage temperatures (e.g. −40 degrees C. to 100 degrees C.); an extremely low (e.g., nearly zero) vapor pressure (e.g., to prevent loss of fluid by evaporation through the lens membranes, particularly where the lens membranes are gas permeable); and a chemical stability with respect to the lens membrane and other fluidic chamber material(s).

For example, in at least some embodiments, the fluidic media can meet one or more of the following exemplary characteristics: the fluidic media can have an index of refraction of at least 1.3; the fluidic medium can transmit at least 20% of an optical signal over a wavelength spectrum that spans at least 200 nm; the fluidic medium is capable of operating over a range of temperature that spans at least 30 degrees Celsius (e.g., a range from −20 degrees Celsius to 60 degrees Celsius); the fluidic medium is capable of being stored over a range of temperature that spans at least 30 degrees Celsius (e.g., a range from −40 degrees Celsius to 100 degrees Celsius).

Further, in at least some embodiments, other considerations also can be taken into account when selecting fluidic media including, for example, safety, biocompatibility and/or toxicity. Such considerations can potentially outweigh shortcomings associated with index of refraction, vapor pressure, or other previously-mentioned design characteristics. For example, in conjunction with a PDMS lens membrane and a silicone rubber lens chamber, fluidic media such as water and methanol often may not be preferred since they have relatively low indices of refraction and may be evaporated through a gas permeable lens membrane; nevertheless, other considerations such as safety and biocompatibility may render these fluidic media preferable in a given application notwithstanding their shortcomings. Additionally for example, in circumstances where a lens system is used inside or close to a human body (e.g., contact lenses, implanted vision correction device(s) after cataract removal, and/or other devices for use during medical procedures), fluidic media such as saline can be a preferred choice in view of considerations such as toxicity, safety and biocompatibility. This is the case even though the use of fluidic media other than saline can potentially enhance device performance and device lifetime.

In some circumstances, fluidic media that comprise desirable characteristics such as those listed above can also comprise characteristics that destroy or damage certain types of lens membranes such as PDMS lens membranes. For example, while a fluidic medium including conventional lens oil can have both low vapor pressure and a relatively high index of refraction, such a fluidic medium will generally be incompatible with a PDMS lens membrane. This is because, over time, molecules associated with the oil in the fluidic medium may become incorporated into the polymer chains of the PDMS of the lens membrane, thus making the PDMS lens membrane swollen or wrinkled.

Thus, in at least some embodiments in which PDMS lens membranes are employed, it is advantageous to select fluidic medium(s) that will not damage the PDMS lens membranes and will retain many of the desired characteristics of those lens membranes as discussed above. In one such embodiment, the fluidic medium(s) (e.g., the fluidic medium(s) 120 and/or 130 of FIGS. 1a and 1b) include polyphenyl ether ("PPE"). A fluidic medium that comprises PPE is typically compatible with a PDMS lens membrane and a silicone rubber-based lens chamber. In further embodiments, alternative chemicals comprising similar properties to PPE can be used as fluid media with PDMS lens membranes. Such chemicals can include, for example, thioethers benzene, and various ionic fluids including, for example, 1-butyl-1-methylpyrrolidinium tris(pentafluoroethyl)trifluorophosphate and 1-hexyl-3-methylimidazolium tris(pentafluoroethyl)trifluorophosphate.

In at least some embodiments, the fluidic medium (or mediums) can be a lens fluid containing a phenyl group, or more particularly a lens fluid containing a phenyl group and also having a molar molecular weight greater than 200 g. In at least some additional embodiments, the fluidic medium can be lens fluid LS5257 available from Nusil Technology LLC of Carpinteria, Calif., or some other type of fluid included within the category of lens oils or polyphenyl ether fluids. In at least some such embodiments, such a fluidic medium (e.g., a lens fluid containing a phenyl group, a lens fluid containing a phenyl group and having a molar molecular weight greater than 200 g, or the lens fluid LS5257) is used in combination with one or more PDMS lens membrane(s) and/or one or more other transparent elastomer membrane(s). Notwithstanding the above discussion, a variety of other fluidic medium(s) are intended to be encompassed within embodiments of the present invention, including a variety of different fluidic medium(s) having a variety of different characteristics in terms of molecular weight, viscosity, transparency, color, thermal expansion coefficient, etc.

Those skilled in the art will readily recognize that numerous variations and substitutions can be made with respect to the above-described embodiments of the present invention, their uses and their configurations, to achieve substantially the same results as achieved by the above-described embodiments. In particular, special considerations can be required for the selection of the lens membrane, lens chamber, and fluid medium(s) for each specific application of the present invention. Accordingly, there is no intention to limit the invention to the disclosed exemplary forms. Many variations, modifications and alternative constructions fall within the scope and spirit of the disclosed invention as expressed in the claims.

Further, it should be understood that, whether any particular fluidic medium is considered "safe", "biocompatible", "non-toxic" or otherwise suitable for any particular application depends upon the purpose, application, the operational environment, and/or operational circumstances. The present discussion is not intended to imply the suitability or unsuitability of any fluidic medium or other feature(s) of fluidic adaptive lenses for any particular purpose, application, operational environment or circumstances. Rather, when implementing a fluidic medium or other feature for any given purpose, application, operational environment or circumstances, it should be considered whether the fluidic medium or other feature is suitable for that purpose, application, operational environment or circumstances.

Systems and Methods Using Lens Membrane(s) and/or Fluidic Medium(s)

The present invention is also intended to encompass a variety of aspects relating to the design and/or construction of fluidic adaptive lenses, as well as the use of one or more such lenses in a variety of environments and applications such as eyeglasses, zoom lens systems and other applications such as those discussed above. FIGS. 2-7 generally relate to the design and implementation of fluidic adaptive lenses for use in eyeglasses that are capable of providing dynamically-adjustable vision correction power. FIGS. 8-18 generally relate to the design and implementation of fluid adaptive lenses and combinations of such lenses for use in zoom lens systems that can be incorporated into a variety of devices such as, for example, cameras in cellular phones, and that are capable of providing variable zooming capability without the need for complicated mechanical devices for physically moving multiple lenses toward or away from one another.

Although FIGS. 2-18 particularly relate to the design and implementation of fluidic adaptive lenses for use in eyeglasses and zoom lens systems, certain embodiments of the present invention are also intended to encompass the use of these or similar fluidic adaptive lenses in a variety of other applications and circumstances including, for example, a wide variety of other electronic and other devices such as microscopes, video monitors, video recorders, optical recording mechanisms, bar-code readers, systems with macro (or magnifying) functions, surveillance equipment, inspection equipment, agile imaging equipment, target tracking equipment, copy machines, scanners, cell phones, personal digital assistants (PDAs), notebook computers, telescopes, magnifying glasses, optometrist testing equipment, and other devices that require lenses. Indeed, certain embodiments of the present invention relate simply to the design and implementation of fluidic adaptive lenses generally, independent of any particular application of such lenses. Certain embodiments of the present invention are intended to encompass a variety of different lenses, lens structures and lens systems that employ one or more fluidic adaptive lenses that are variable in terms of optical characteristics, including a variety of lens types such as convex, concave, convex-concave, positive or negative meniscus, plano-convex, plano-concave, biconvex and biconcave lenses.

Figure 2:
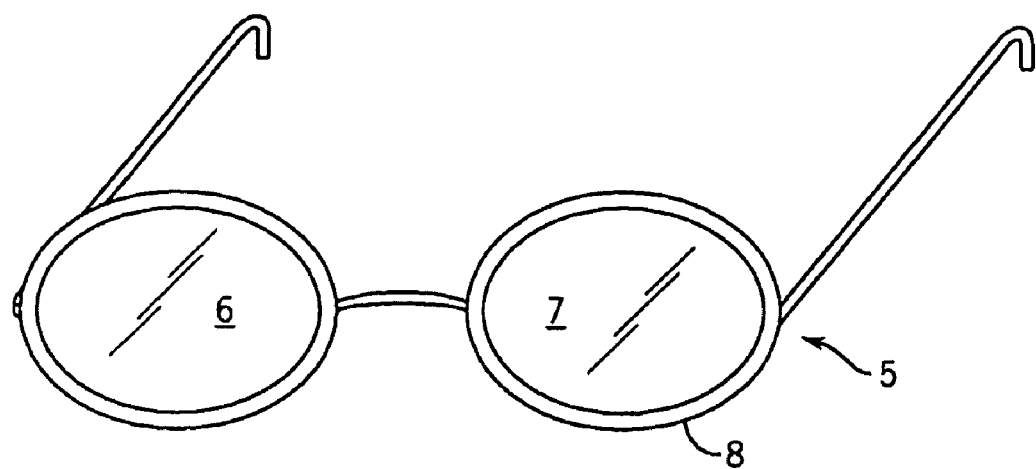
FIG. 2 shows a pair of eyeglasses within which fluidic adaptive lenses are employed of the present invention.
Figure 3A:
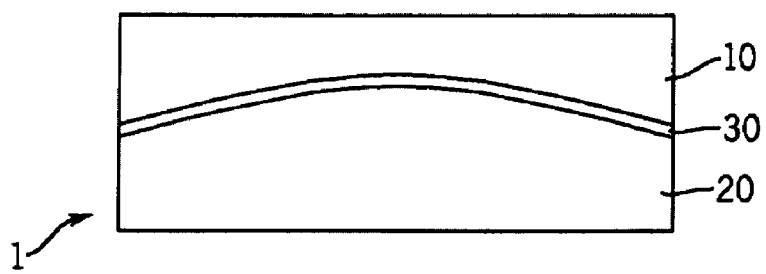
FIGS. 3a and 3b show, in simplified schematic form, cross-sectional views of a convex fluidic adaptive lens and a concave fluidic adaptive lens, respectively.
Figure 3B:
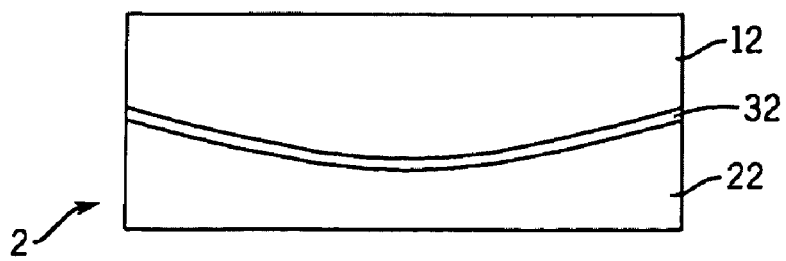

Referring to FIGS. 2, 3a and 3b, exemplary fluidic adaptive lenses capable of being implemented in eyeglasses are shown in schematic form. FIG. 2 shows an exemplary pair of eyeglasses 5 in which two fluidic adaptive lenses 6,7 are supported by frames 8. Turning to FIGS. 3a and 3b, those figures show in cross-section two different types of lenses that could be implemented as the lenses 6, 7 in the eyeglasses 5 of FIG. 2. FIG. 3a shows in general form a first fluidic lens 1 that can be used to correct hyperopia (farsightedness). As shown, the fluidic lens 1 is a convex adaptive vision correction lens that contains a first medium 20 that is a higher index fluid, a second medium 10 that is a lower index fluid, and a flexible membrane (or diaphragm) 30 that separates the two media. The flexible membrane 30 bends toward the lower index side when the pressure of the higher index fluid is greater than that of the lower index fluid. In contrast to FIG. 3a, FIG. 3b shows the general situation of a second fluidic lens 2 that can be used to correct myopia (nearsightedness). As shown, the fluidic lens 2 is a concave adaptive vision correction lens that contains a first medium 22 that is a higher index fluid, a second medium 12 that is a lower index fluid, and a flexible membrane (or diaphragm) 32 that separates the two media. The membrane 32 bends towards the higher index side when the pressure of the lower index fluid is greater than that of the higher index fluid.

The respective flexible membranes 30, 32 are deformed by the pressure differences between the respective pairs of media 10, 20 and 12, 22. For example, if the pressure on the higher index medium side is greater than that of the lower index medium side, the membrane will bend towards the low index medium, as shown in FIG. 3a, to form an effective convex lens capable of correcting the hyperopia (farsightedness) problem. On the other hand, if a higher fluidic pressure exists on the low-index medium side, the membrane will bend towards the high-index medium to form an effective concave lens capable of correcting the myopia (nearsightedness) problem (see FIG. 3b).

Figure 4A:
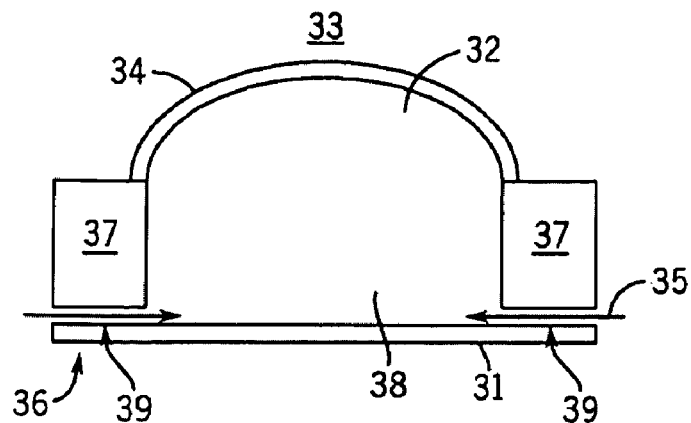
FIGS. 4a and 4b show, in more detail, cross-sectional views of the exemplary convex and concave fluidic adaptive lenses of FIGS. 3a and 3b, respectively, along with related support structures.
Figure 4B:
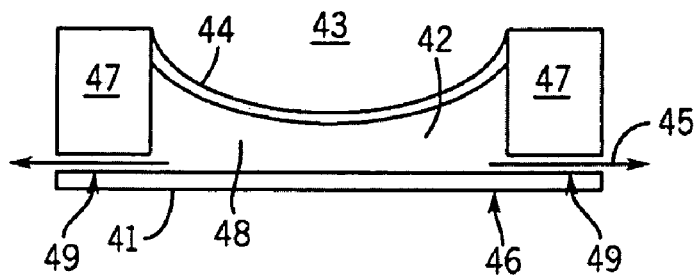

Turning to FIGS. 4a and 4b, exemplary fluidic lenses 36 and 46 are shown in cross-section, respectively. The lenses 36, 46 show in greater detail exemplary structures that can be employed as the convex and concave adaptive vision correction lenses 1, 2 shown schematically in FIGS. 3a and 3b, respectively. As shown, the lenses 36 and 46 each include a segment of transparent rigid material 31 and 41, respectively, a first fluidic medium 32 and 42, respectively, a second fluidic medium 33 and 43, respectively, and a flexible membrane (or diaphragm) 34 and 44, respectively. In the present embodiment, the second fluidic media 33,43 are shown as air outside of the lenses 36,46, although those fluidic media could be other fluids (gaseous or liquid) as well.

Additionally, each of the lenses 36, 46 includes a respective wall 37, 47 that supports its respective membrane 34, 44 with respect to its respective transparent rigid material 31, 41. The walls 37, 47 encircle their respective lenses 36, 46, which typically are circular or oval-shaped when viewed from the front of the lenses (albeit the lenses could have other shapes as well). The walls 37, 47 and the transparent rigid materials 31, 41 respectively form fluidic lens chambers. The fluidic lens chambers (e.g., comprising walls 37, 47 and transparent rigid materials 31, 41), along with the membranes 34, 44, define respective internal cavities 38,48 within which are the first fluidic media 32, 42. The walls 37, 47 of the fluidic lens chambers define respective channels 39,49 by which the first fluidic media 32, 42 can enter and exit the cavities 38, 48. In certain embodiments, the walls 37, 47 can be formed within the frames 8 of the eyeglasses 5. Also as shown in FIGS. 4a and 4b, arrows 35, 45 respectively represent the directions of the flow (and/or pressure) of the media 32, 42 with respect to the cavities 38, 48 that are appropriate for causing the respective lenses 36, 46 to become convex and concave, respectively. As shown, the first fluidic medium 32 tends to flow into the cavity 38 causing the membrane 34 to expand outward while the first fluidic medium 42 tends to flow out of the cavity 45 tending to cause the membrane 44 to contract inward.

By controlling the amounts of the first fluidic media 32, 42 that flow in and out of the cavities 38, 48 (which can depend upon the pressure of those media), the optical properties of the lenses 36, 46 can be varied. In particular, because in the present embodiment the second fluidic media 33, 43 are the air of the atmosphere, by applying a positive pressure to the first fluidic medium 32 (e.g., a pressure greater than the atmospheric pressure), the membrane 34 tends to expand outward as shown in FIG. 4a, and by applying a negative pressure to the first fluidic medium 42 (e.g., a pressure less than the atmospheric pressure), the membrane 44 tends to contract inward as shown in FIG. 4b. Thus, the lenses 36 and 46 could in fact be the same lens, which in one state has been configured as a convex lens and in another state has been configured as a concave lens.

Although the lenses 36, 46 shown in FIGS. 4a and 4b are physically capable of operating as lenses (e.g., capable of causing light to be focused or to be dispersed), the structures of these lenses are not preferred. Because the membranes 34, 44 in these embodiments are exposed to the outside atmosphere and outside environment, atmospheric pressure changes, temperature changes and/or external impacts all can damage or change the optical properties of the lenses 36, 46, such that the lenses can suffer from reliability, stability (including drift of the lenses' optical properties), and performance issues. Particularly in the mode of the concave lens 46 of FIG. 4b, a fluidic lens chamber has to maintain a negative pressure relative to the atmosphere, which requires an airtight design that is harder to achieve and keep stable than a leak-tight design for positive fluid pressure. Consequently, while suitable for some applications, the lenses 36, 46 can be used in eyeglasses primarily only when high viscosity and very low vapor pressure fluid is used as the liquid medium, which limits the manufacturability of the devices.

Figure 5A:
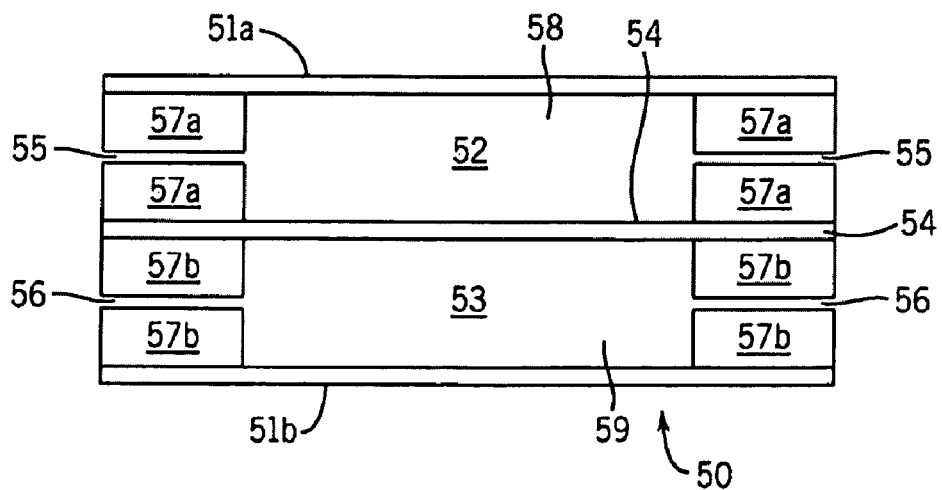
FIGS. 5a and 5b show two cross-sectional views of other exemplary embodiments of fluidic adaptive lenses that maintain a constant outer shape.
Figure 5B:
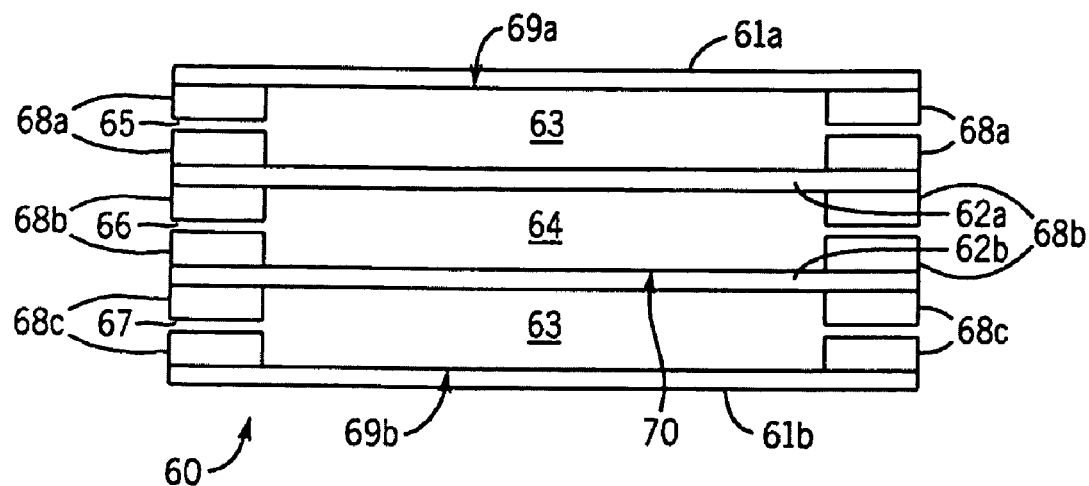

Two improved designs for fluidic adaptive lenses that are capable of being employed as the lenses 6 and 7 of the eyeglasses 5, and that are more robust and stable in operation than the lenses 36, 46 of FIGS. 4a-4b, are shown in FIGS. 5a and 5b as lenses 50 and 60, respectively. To minimize the influence of the environment such as atmospheric pressure, the lenses 50, 60 employ rigid materials to form all (or nearly all) of the outer surfaces of the lenses. As shown, the lens 50 of FIG. 5a in particular includes two fluid lens chambers, while the lens 60 of FIG. 5b includes three fluidic lens chambers.

Referring to FIG. 5a, the lens 50 includes several components. First, the lens 50 includes a pair of transparent, rigid outer surfaces 51 (on both sides of the lens) that are capable of keeping the outer shape of the lens unchanged as in the case of conventional solid lenses. Additionally, the lens 50 includes a flexible membrane (or diaphragm) 54 positioned in between the rigid outer surfaces 51, and a pair of walls 57 that support the membrane 54 in relation to the surfaces 51a, b. Further, a lower index first fluidic medium 52 is contained within a first cavity 58 defined by the membrane 54, and a fluidic lens chamber comprising the walls 57a and the rigid outer surface 51a. A higher index second fluidic medium 53 is contained within a second cavity 59 defined by the membrane 54, and a fluidic lens chamber comprising the walls 57b and the rigid outer surface 51b. Also, the lens 50 includes first and second pairs of channels 55 and 56 that extend through the walls 57a, b, respectively, and respectively connect the first and second cavities 58 and 59 with fluid reservoirs (see FIG. 6). In alternate embodiments, the channels 55, 56 can extend through the surfaces 51 rather than through the walls 57. Also, while in FIG. 4a there are a pair of channels 55, 56 leading to each of the cavities 58, 59, respectively, in alternate embodiments there need be only one channel or there could be more than two channels for one or both of the cavities (or, in some cases, only one of the two cavities might be accessible by one or more channels).

The lens 50 can be employed either as the convex lens 1 of FIG. 3a or the concave lens 2 of FIG. 3b depending upon the pressures of the first and second fluidic media 52, 53. When the pressure of the first fluidic medium 52 is greater than that of the second fluidic medium 53, the membrane 54 bends towards the cavity 59 and the device behaves as a concave lens for myopia. When the pressure difference between the two chambers is reversed, the lens behaves as a convex lens for hyperopia. The pressures within each of the fluidic cavities 58, 59 can be controlled by one or more mechanical or electromechanical actuator(s) that determine the pressure and direction and rate of flow into or out of the cavities by way of the channels 55, 56. The curvature of the membrane 54 is determined by the pressure difference between the pressures within the cavities 58, 59 (as well as possibly characteristics of the membrane itself).

Regardless of the particular magnitude/sign of the pressure difference between the first and second fluidic media 52, 53 within the first and second cavities 58, 59, and regardless of the atmospheric pressure, the outer shape of the lens 50 does not change since it is defined by the rigid outer surfaces 51. Thus, in contrast to the lens designs of FIGS. 4a-4b, the lens 50 of FIG. 5a does not require the maintaining of a negative pressure to achieve a concave structure, so the structure does not need to be made air-tight. Because the viscosity of air and liquid differs by many orders of magnitude, it is far easier to achieve a leak-tight structure than an air-tight structure. Finally, since it is the fluidic pressure difference that determines the curvature of the membrane 54, that lens property is independent of the atmospheric pressure that is equally applied to both fluidic media 52, 53. On the other hand, temperature changes will cause a very minor index change of the media through the thermo-optic effect, having an unnoticeable effect upon the eyeglasses 5.

As for the lens 60 shown in FIG. 5b, this lens employs two transparent rigid outer surfaces 61a-b, two flexible membranes 62a-b positioned in between the outer surfaces 61a-b, and three sets of walls 68a-c supporting the membranes 62a-b in relation to the outer surfaces 61a-b. The walls 68a are positioned between the membrane 62a and the outer surface 61a, the walls 68b are positioned between the membranes 62a-b, and the walls 68c are positioned between the membrane 62b and the outer surface 61b. The outer surface 61a and the walls 68a define a fluidic lens chamber, and the outer surface 61b and the walls 68c define another fluidic lens chamber.

The outer surfaces 61a-b, the membranes 62a-b, and the sets of walls 68a-c define three cavities. An inner cavity 70 is positioned between the membranes 62a-b. The outer cavities 69a-b are positioned on the other sides of the membranes 62a-b. A low index fluid 63 is provided into the outer cavity 69a, which is defined by the membrane 62a and the fluidic chamber comprising the walls 68a and the outer surface 61a. Additionally, the low index fluid 63 is provided into the outer cavity 69b, which is defined by the membrane 62b and the fluidic chamber comprising the walls 68c and the outer surface 61b. A high index fluid 64 is provided into the inner cavity 70 defined by the walls 68b and the two membranes 62a-b. Three fluidic channels 65, 66 and 67 (or pairs or sets of channels) respectively connect the respective cavities 69a-b and 70 to fluid reservoirs (see FIG. 6), which can be two (e.g., one for the high index fluid and one for the low index fluid) or three (e.g., one corresponding to each of the cavities) in number.

When the pressure of the high index fluid 64 is greater than the pressure of the low index fluid 63, the lens 60 behaves as a convex lens for hyperopia. However, when the pressure difference is reversed, the lens behaves as a concave lens for myopia. Because the lens 60 has rigid outer surfaces 61 as in the case of the lens 50, the lens 60 has the same advantages as the lens 50 in terms of stability, reliability and performance. In alternate embodiments, the high index fluid can be in the outer cavities 69a-b and the low index fluid can be in the inner cavity 70, or each of the cavities can contain fluid having the same index or having an index different than each of the other cavities.

Figure 6:
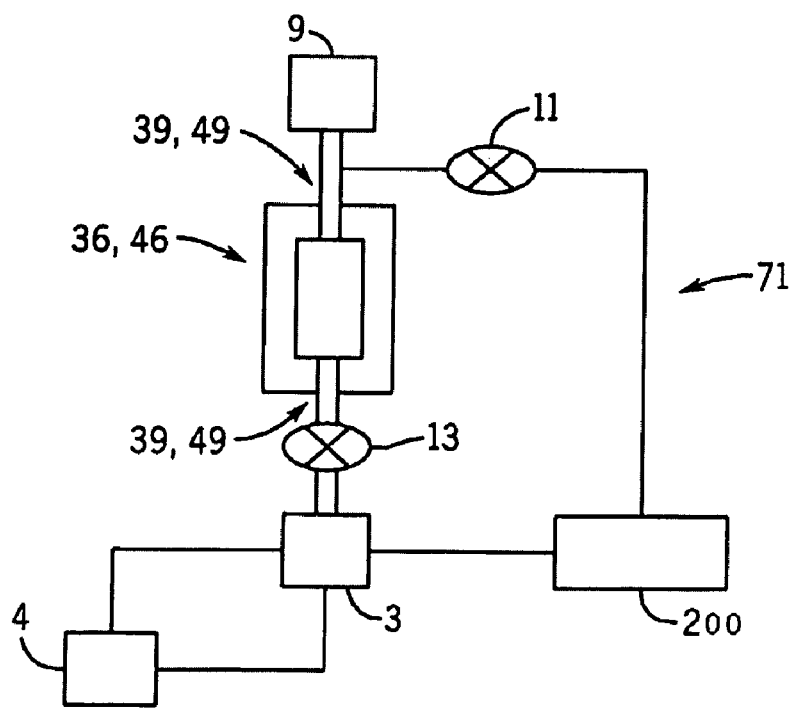
FIG. 6 shows, in simplified schematic form, a hydraulic circuit that can be employed with respect to lenses such as those in FIGS. 3a and 3b.

Referring to FIG. 6, an exemplary hydraulic circuit 71 for controlling the fluid pressure within a fluidic adaptive lens such as one of the lenses 36,46 of FIGS. 4a and 4b is shown. As shown, the hydraulic circuit 71 includes a fluid reservoir 2 that is coupled by way of a first valve 11 to one of the channels 39/49 of the lens 36/46. Additionally, the fluid reservoir 2 is also coupled, by way of a minipump 3 and a second valve 13, to another of the channels 39/49 of the lens 36/46. The minipump 3 (and possibly also the valves 11,13) is controlled by way of an electrical circuit 4. Also, a pressure sensor 9 is coupled to a junction between the valve 11 and the lens 36/46, allowing for the pressure within the lens to be sensed. Based upon the commands of the electrical circuit 4, the minipump 3 can operate to pump fluid from the reservoir 2 into the lens 36/46 or, alternatively, pump fluid from the lens back into the reservoir, assuming that the valve 13 is in an open state. Depending upon the opening and closing of the valve 11, fluid can also proceed from the lens back to the reservoir (or possibly in the opposite direction as well).

The electrical circuit 4 controlling the hydraulic circuit 71 can take any of a variety of forms including, for example, a microprocessor, a programmable logic device, a hard-wired circuit, a computerized device programmed with software, etc. The electrical circuit 4 can operate based upon preprogrammed instructions or, alternatively, in response to commands received from an outside source (e.g., in response to pushbuttons pushed by a user, a received wireless signal, and other signals). In the embodiment shown, the electrical circuit 4 can receive feedback information from the pressure sensor 9 regarding the actual pressure within the lens 36/46, and base its operation upon that feedback information. Also, the mini-pump or actuator 3 can take on a variety of forms, or be replaced with a variety of other pumping mechanisms. For example, the mini-pump or actuator 3 could be a peristaltic pump, a small frame-mounted pump, a piezoelectric actuator, a microelectromechanical system (MEMS) actuator, an electromagnetic actuator, or a tunable integrated micropump such as that disclosed in U.S. provisional patent application No. 60/625,419 entitled "Tunable Fluidic Lenses With Integrated Micropumps" filed Nov. 5, 2004, which is hereby incorporated by reference herein. Also, pressure within the lens 36/46 could be adjusted by way of a Teflon-coated set screw. The overall circuit 71 might be battery-powered or powered in some other manner, e.g., by line power or solar power.

Although the hydraulic circuit 71 is shown in conjunction with one of the lenses 36, 46, this type of hydraulic circuit, or several of such circuits, could also be employed in relation to the lenses 50,60 of FIGS. 5a and 5b and other fluidic adaptive lenses. For example, two of the hydraulic circuits 71 could be used in relation to the lens 50 with its two cavities, while two or three of the hydraulic circuits could be used in relation to the lens 60 with its three cavities. The hydraulic circuit 71 is intended only to be exemplary, and certain embodiments of the present invention can encompass any of a variety of such circuits or other mechanisms that would be capable of adjusting the pressure of the fluid medium within the lens 36/46. For example, depending upon the embodiment, two valves and channels linking the cavity of the lens 36/46 to the reservoir 2 need not be used and, in some such embodiments, only one channel constituting an inlet and an outlet with respect to the lens, and/or one valve, might be necessary.

Figure 7:
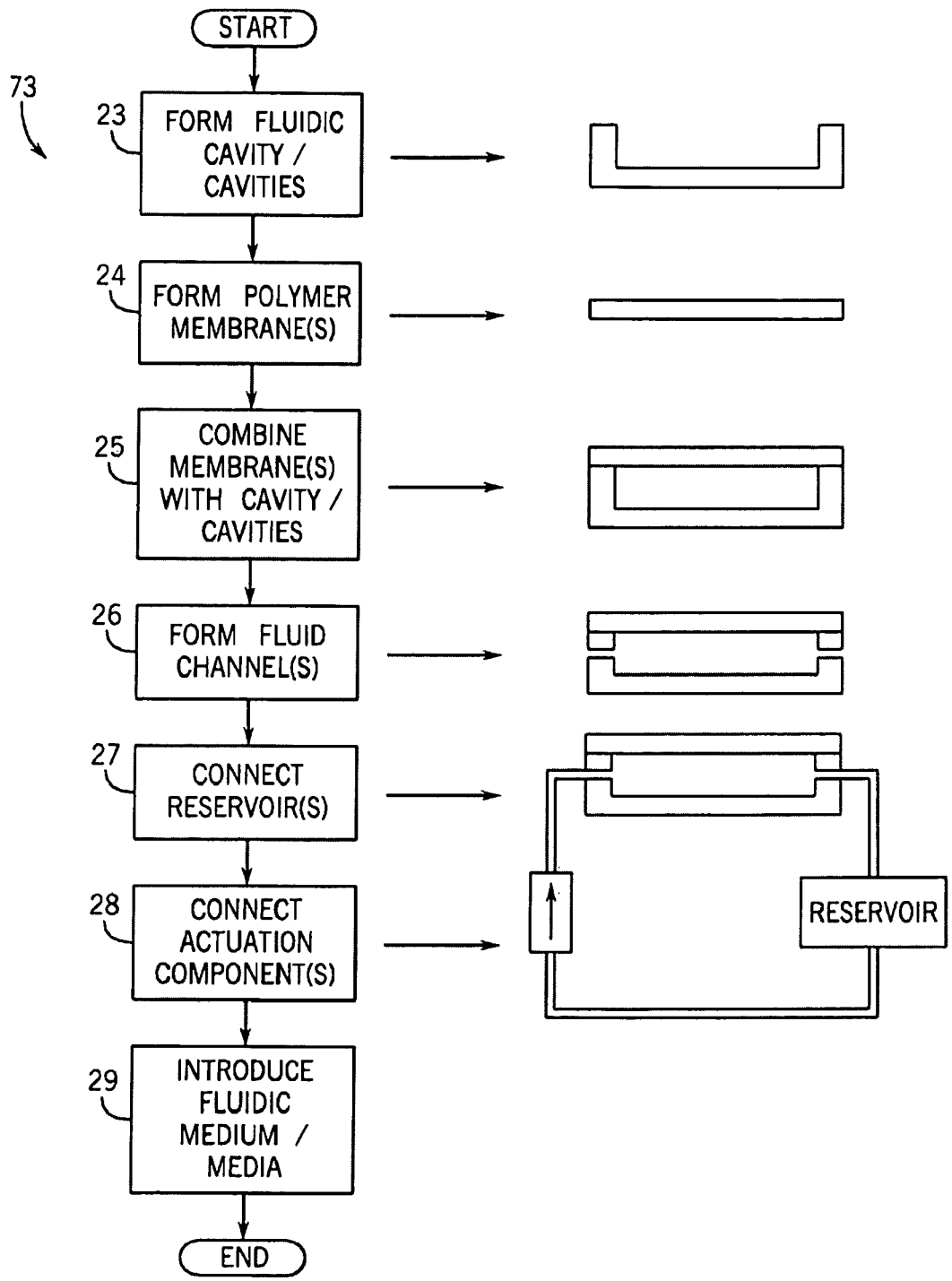
FIG. 7 is a simplified flow chart showing exemplary steps of a procedure for creating a hydraulic circuit such as that of FIG. 6 employing lenses such as those in FIGS. 4a-4b.

Turning to FIG. 7, a flowchart 73 shows steps of an exemplary procedure that can be used to manufacture hydraulic circuits such as the hydraulic circuit 71 of FIG. 6 that employ fluidic adaptive lenses such as the lenses 36,46 of FIGS. 4a-4b. Similar procedures could be used to manufacture hydraulic circuits for controlling fluidic adaptive lenses such as those in FIGS. 5a-5b. As shown, upon starting the process, in a first step 23, an open-ended cavity is formed using a plastic polymer material such as polydimethylsiloxane (PDMS) or polyester. The typical dimension of the cavity would range from about one millimeter to a few centimeters in diameter and from about one tenth to a few millimeters in height. The surfaces defining the cavity can be understood to include both the rigid outer surface 31/41 and the wall 37/47 shown in FIGS. 4a-4b. Although primarily formed by the plastic polymer material, the rigidity of the cavity surfaces (particularly the portion of its surfaces corresponding to the outer surfaces 31/41) could be supplemented by bonding the plastic polymer material to a thin (e.g., 150 μm) glass slide.

In a second step 24, a thin plastic polymer membrane is formed, again possibly through the use of PDMS. The membrane is flexible (albeit not permeable), such that the membrane can be used as a flexible diaphragm separating regions in which different fluidic media having different indices of refraction are positioned. The membrane thickness typically would be on the order of about 30 to 100 μm. Each of the cavity and the membrane can be fabricated using a soft lithography process such as that discussed in "Soft Lithography" by Y. Xia and G M. Whitesides (Angew. Chem. Int. Ed. Engl. 37, 550-575 (1998)), which is hereby incorporated by reference herein. Next, in a third step 25, the membrane formed in step 24 is bonded to the cavity formed in step 23 to form a closed cavity/chamber. The bonding could be achieved by way of an oxygen plasma surface activation process, such as that discussed in "Three-dimensional micro-channel fabrication in polydimethylsiloxane (PDMS) elastomer" by B. H. Jo et al. (J. Microelectromech. Syst. 9, 76-81 (2000)), which is hereby incorporated by reference herein. When produced in large volumes, standard industrial processes such as injection molding and die casting can be adopted to fabricate such lenses.

Then, in a fourth step 26, one or more channels 39/49 are formed along the wall/side of the lens 36/46 for the inlet and outlet of a fluid medium into and out of the closed cavity. Although not necessary, there are typically two channels per cavity, one of which constitutes an inlet for fluid when fluid pressure within the cavity is being increased and the other of which constitutes an outlet for fluid when fluid pressure is being decreased. Although typically formed in the wall of the lens 36/46, such channel(s) could alternatively be formed in the other surfaces of the cavity, even in the membrane. Further, in fifth and sixth steps 27 and 28, respectively, the one or more channels are connected to a fluid reservoir and to actuation components, respectively. As discussed above, the reservoir serves as a store of fluid. The actuation components, which could include, for example, each of the minipump 3, the valves 11,13 and the electrical circuit 4 shown in FIG. 6, cause fluid to be provided to the reservoir from the cavity and vice-versa. Finally, in a seventh step 29, a fluidic medium is introduced into the cavity from the reservoir, and then the fabrication of the hydraulic circuit is complete, such that hydraulic circuit including the lens could then be mounted to/within the frame of a pair of eyeglasses such as those of FIG. 2.

Although FIG. 7 is directed toward the formation of a hydraulic circuit for controlling a fluidic adaptive lens having one cavity such as those shown in FIGS. 4a and 4b and FIG. 6, the process could easily be modified to allow for the creation of lenses such as those shown in FIGS. 5a and 5b and corresponding hydraulic circuits for controlling the operation of such lenses. For example, the lens 50 could be formed by following the process of FIG. 7 and, additionally, forming a second cavity at step 23 and attaching that second cavity in step 25 to the side of the membrane that was opposite to the side on which the first cavity was attached. Additionally, the formation of a hydraulic circuit for controlling the operation of the lens 50 would involve the formation of additional channels within the second cavity at step 26, the connecting of additional reservoirs and actuation elements at steps 27 and 28, and the introduction of a second fluidic medium at step 29.

Likewise, with respect to the lens shown in FIG. 5b, in which there are three cavities, two of which are between the two membranes 62, the process of FIG. 7 could be further modified to include additional steps where (1) a middle cavity is formed between two membranes (which themselves would typically be separated by a wall), (2) the two membranes are then attached to the outer cavities, and (3) the appropriate formation of channels, connections to reservoirs and actuation components, and introduction of fluidic media are accomplished. It should further be noted that, typically, when multiple cavities exist, at least two different fluidic media having different refractive indices will be introduced into the different cavities from corresponding different reservoirs. Any of a variety of fluidic media can be employed. For example, one of the media can be water (e.g., deionized water) having an index of 1.3 and the other medium can be oil having a refractive index of about 1.6. Alternatively, other media including gaseous media such as air can be utilized. In alternate embodiments, the channels could also be formed prior to the combining step 25.

The use of fluidic adaptive lenses such as those discussed above with reference to FIGS. 2a-4b (and particularly those of FIGS. 5a and 5b) in eyeglasses provides numerous benefits. The fluidic adaptive lenses (and related hydraulic circuits) can be mass-produced as identical units, where the corrective power of each individual lens is set after the manufacturing process has been completed. Therefore the design offers a fundamentally low cost solution from the production point of view. Also, while optometrists can still determine the corrective power of the fluidic adaptive lenses, the fluidic adaptive lenses also can be dynamically adjusted in terms of their corrective power by the eyeglass wearers themselves. This could significantly reduce the frequency with which eyeglass wearers might need to visit optometrists to obtain new prescriptions for eyeglasses. At a minimum, the time and costs associated with obtaining eyeglasses with new prescriptions could be significantly reduced since, upon visiting their optometrists for eye exams, the optometrists could simply ""tune"" the wearers' existing glasses rather than order new glasses.

Further, even when eyeglasses are being replaced, patients will benefit from the use of tunable eyeglasses. Given the tunability of their existing eyeglasses, the patients will not need to suffer from compromised vision during the time period while they are awaiting their new eyeglasses. Additionally, because the fluidic adaptive lenses can be varied continuously in their corrective power over a wide range, the use of these lenses makes it possible for optometrists to provide eyeglass wearers with lenses that more exactly suit the wearers' needs, instead of merely selecting lenses that are the "nearest fit" to the wearers' needs from among a set of standardized lenses. Indeed, fluidic adaptive lenses could serve as a more graduated substitute for the solid-state lens set that optometrists use in determining their customers' prescriptions, and thereby allow optometrists to render more accurate prescriptions. Thus, fluidic adaptive lenses can be utilized in optometrists' examination equipment. Additionally, fluidic adaptive lenses can eliminate any undesirable cosmetic effect for those who need bifocal lenses (or multi-focal lenses). Instead of utilizing bifocals, a person can instead simply wear a single pair of eyeglasses that is capable of being modified in its optical properties as necessary for person's circumstance, e.g., based upon the flipping of a "dip switch" on the eyeglasses of the person.

To estimate the adjustment power of the fluidic adaptive lens 50 shown in FIG. 5a, one can assume that the diameter of the lens is 20 millimeters. Compared to the diameter change of a human pupil from about 2 millimeters in sunlight to 8 millimeters in the dark, this lens diameter is large enough for eyeglasses. Further, to estimate the adjustment power range of the fluidic adaptive lens 50, one can also assume that the low index medium is air with a refractive index of 1 and the high index medium is water with a refractive index of 1.333. Using a ray-tracing simulation program or the thin lens approximation for an analytic solution, we have found that the maximum positive power and negative power of the above fluidic adaptive lens is 12.8 D (diopters) and −12.8 D, respectively. Hence the total adjustment range for the adaptive corrective lens is from −12.8 D to 12.8 D, corresponding to an uncorrected visual acuity of 0.017 minute$^{-1}$ for hyperopia (farsightedness) and 0.022 minute$^{-1}$ for myopia (nearsightedness).

Further, if silicone oil is utilized as the high index medium (refractive index is about 1.5) and water is used as the low index medium, then the total adjustment power range for such adaptive lenses becomes from 6.4 D to −6.4 D, corresponding to an uncorrected visual acuity of 0.036 minute$^{-1}$ for hyperopia and 0.042 minute$^{-1}$ for myopia. Also, if silicone oil is used as the high index medium and air is used as the low index medium, then the total adjustment range for the fluidic adaptive lens becomes from 19.2 D to −19.2 D, corresponding to an uncorrected visual acuity of 0.010 minute$^{-1}$ for hyperopia and 0.016 minute$^{-1}$ for myopia. Although these estimates are for a fluidic adaptive lens such as the lens 50 of FIG. 5a, corresponding estimates for other types of fluidic adaptive lenses (e.g., the lens 60 of FIG. 5b having three cavities 63, 64) can also be readily determined. Also, a wide variety of fluids of different indices can be employed other than silicone oil, water and air to make the lenses and allow the lenses to take on a variety of optical properties, which can be easily analyzed based on the principles of geometric optics. Likewise, the particular materials used to form the rigid outer surfaces, walls and flexible membranes of the lenses can include any of a variety of plastic, acrylic and other materials, and can vary from embodiment to embodiment.

From experimental observations, several other performance aspects of fluidic adaptive lenses have also been determined. In particular, it has been determined that the fluidic adaptive lenses allow for dynamic control over each of the focal length, power, field-of-view, F-number, and numerical aperture (NA) as a function of fluidic pressure within the lenses. Also, it has been determined that there exists no clear dependence of the image quality provided by fluidic adaptive lenses on the thickness of their membranes. Resolution and image quality in general suffers as the focal length increases beyond a certain length, where the pressure of the fluid is low (which, among other things, can result in gravity having a non-negligible effect on the shape of the membrane). This problem can be corrected by using membranes of greater stiffness, at the expense of higher power consumption and maximum power requirement on the mini-pump and actuator. Assuming the use of lenses that are generally circular in shape, the membrane (except when flat due to not being flexed) tends to have a generally spherical shape, albeit the membrane tends to be somewhat flatter near its center. In at least one experimental fluidic adaptive lens having a PDMS fluidic chamber covered by a 60 μm PDMS membrane and bonded to a thin 150 μm glass slide, the relation between the focal length of the lens and the fluidic pressure within the lens was determined to be as follows: $\mathrm{Ln}(f) = -0.4859\, \mathrm{Ln}\,(P) + 7.9069$.

Figure 8:
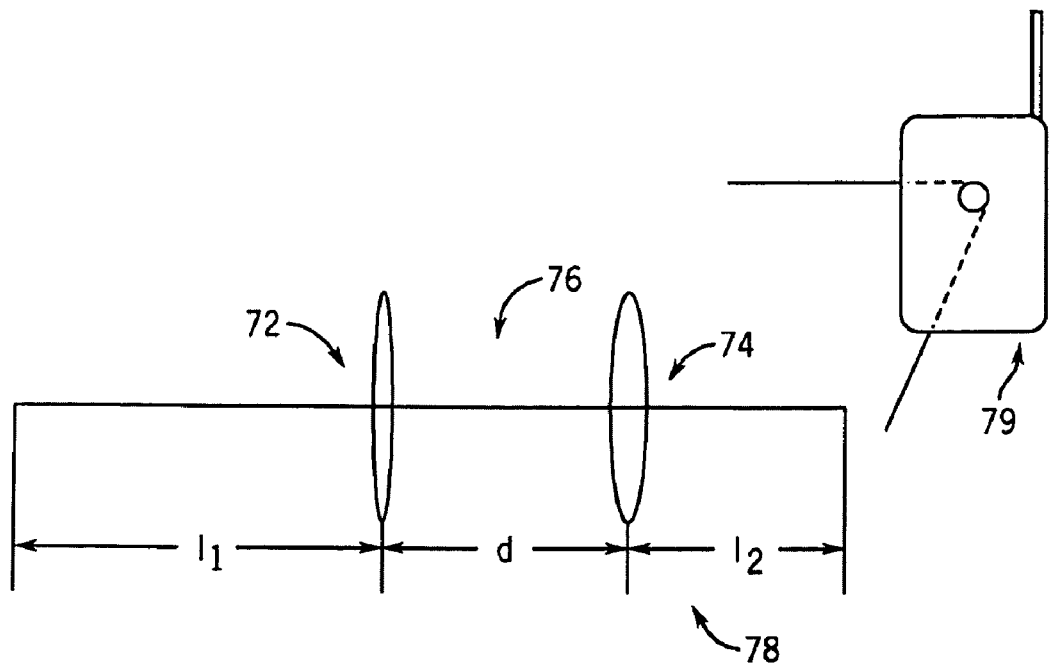
FIG. 8 shows in schematic form a zoom lens system employing at least one fluidic adaptive lens.

Turning to FIG. 8, in accordance with certain embodiments of the present invention, two or more fluidic adaptive lenses can also be employed in devices that require multiple lenses. FIGS. 8-17 relate to various implementations of pairs of fluidic adaptive lenses to form zoom lens systems (and, in particular, zoom lens systems that can be implemented in compact electronic or other devices). However, certain embodiments of the present invention are also intended to encompass other types of multi-lens systems employing more than two lenses, lens systems in which one or more of the lenses are fluid adaptive lenses and other(s) of the lenses are conventional, solid (or other types of) lenses, and lens systems that operate to perform other functions besides or in addition to the zooming functions that are performed by zoom lens systems.

Referring specifically to FIG. 8, a two-lens optical zoom system 78 suitable for implementation in a compact electronic device such as a cellular phone 79 is shown in a simplified schematic form. As shown, the zoom system 78 includes a front lens 72 (near an object) and a back lens 74 (near an image of the object) that are separated by a distance (termed the "lens spacing") d that is constant. In between the lenses, 72 74, an optical medium 76 is typically situated. Depending upon the embodiment, the medium 76 between the two lenses 72, 74 can be any of a variety of optically transparent materials including, for example, air, glass, polymer, or anything transparent at the wavelengths of interest. For simplicity without losing generality, it can be assumed that both of the lenses 72, 74 are thin so that thin lens approximations can be applied throughout the analysis. Each of the lenses 72, 74 has a respective imaging distance $l_1$ and $l_2$, respectively, the latter of which is fixed. Zooming is achieved by varying the respective focal distances $f_1$ and $f_2$ of the respective lenses 72, 74 (these and other notations/variables used to describe characteristics of the two-lens optical zoom system 78 are shown in FIG. 8).

Following the conventions of lens analysis, the variable $\Phi$ of a lens or lens system is defined as the power of the respective lens or lens system, which is also equal to the inverse (reciprocal) of the focal distance f of the respective lens or lens system. Thus, while each of the lenses 72, 74 has its own values for $\Phi$ (e.g., $\Phi_1$ and $\Phi_2$, respectively), of particular interest for the two-lens optical zoom system 78 is an overall power of the system $\Phi_\tau$. This quantity $\Phi_\tau$ can be determined as a function of the respective powers $\Phi_1$ and $\Phi_2$ of the lenses 72, 74 and other parameters as follows:

$$\Phi_2 = \frac{1}{l_2} + \frac{1 + \Phi_1 \times l_1}{\Phi_1 \times l_1 \times d + d - l_1} \quad (1)$$

$$\Phi_\tau = -\frac{d}{l_2} \times \frac{\left(\Phi_1 + \frac{d - 2l_1}{2d \times l_1}\right)^2 - \frac{d^2 + 4l_1 \times l_2}{4d^2 \times l_1^2}}{\Phi_1 + \frac{d - l_1}{d \times l_1}} \quad (2)$$

Equation 1 shows that for given object and image plane distances ($l_1$ and $l_2$; respectively) and the lens spacing d, the power $\Phi_2$ of the second lens 74 (as well as the focal distance $f_2$ of that lens) is uniquely determined by the power $\Phi_1$ of the first lens 72 (as well as the focal distance $f_1$ of that lens). Further, Equations (1) and (2) together show that, for a given object conjugate, the overall power of this two-lens system ($\Phi_\tau$) can be adjusted by varying the powers of both lenses $\Phi_1$ and $\Phi_2$ (or, alternatively, the focal distances of both lenses $f_1$ and $f_2$). In comparison, conventional designs using lenses with fixed focal distances (e.g., solid lenses) have to rely on varying the lens spacing d and the image plane distance h to adjust the power of the system. Zoom ratio (ZR), a parameter of merit for zoom systems, is defined as the ratio of the maximal achievable power and the minimal achievable power (e.g., ZR=$\Phi$max/$\Phi$min, both of which are values of $\Phi_\tau$). From Equations (1) and (2), it is evident that, to achieve a high zoom ratio for given object and image plane distances, one should vary the focal distances as much as possible. These concepts and conclusions also hold for zoom systems having more than two lenses.

Although, in principle, the concept of zooming via varying the focal distances could be applied using any type of fluidic adaptive lens, it appears that no tunable or adaptive lenses reported to date have had a wide enough tuning range to be practical. For example, the shortest focal length ever demonstrated in liquid crystal adaptive lenses is about 200 mm for a lens aperture of around 5 mm corresponding to an f-number of about 40, which is insufficient to allow appreciable zooming effect. Both theoretical analysis and ray tracing simulation indicate that highly effective zoom systems can be achieved only if the focal distances of the lenses can be tuned continuously from a distance much greater than the lens aperture to comparable to or shorter than the aperture. In other words, for a 5 mm lens aperture, one would need to acquire a range of focal length from several centimeters to 5 mm or less, a value 40 times less than the shortest focal length demonstrated in state-of-the-art liquid crystal adaptive lenses.

Further, an even higher zoom ratio can be obtained if not only the focal distances of the lenses but also the "types" of the lenses can be adapted or converted between being positive lenses (having a positive focal distance such as in the case of a convex lens) and negative lenses (having a negative focal distance such as in the case of a concave lens) and vice versa. Liquid crystal adaptive lenses are (at least at the present time) incapable of being changed in their type.

In accordance with an embodiment of the present invention, the two-lens optical zoom system 78 (or similar systems) when equipped with fluid adaptive lenses can achieve sufficiently high zoom ratios, without varying the lens spacing d separating the lenses 72, 74 within the system. By using fluidic adaptive lenses, not only can the focal distances of the lenses 72, 74 be widely varied or tuned, but also the lenses can be changed or converted in their type. FIGS. 9-18 concern various structures that can be used for the lenses 72, 74 and zoom system 78 as well as a fabrication technique for such lenses. However, certain embodiments of the present invention are also intended to encompass other structures and fabrication techniques for creating zoom systems by way of fluidic adaptive lenses that will be evident to those of ordinary skill in the art.

Figure 9:
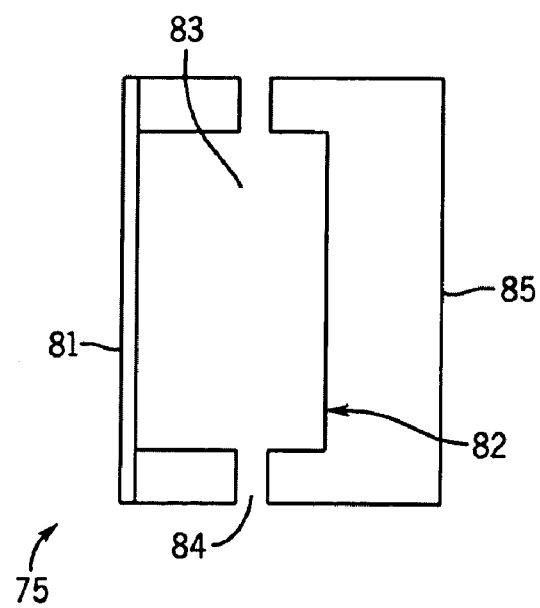
FIG. 9 shows a cross-sectional view of an exemplary fluidic adaptive lens capable of being used to achieve a wide focal-distance tuning range.

FIG. 9 shows exemplary component structures of a fluidic adaptive lens 75 that can be used as each of the lenses 72, 74 of FIG. 8. As shown, the lens 75 includes a deformable/flexible membrane (or diaphragm) 81 that is coupled to the rim of a cup-shaped structure 85 having a fluid-containing lens cavity 82 that includes a fluidic medium 83. One or more (in this case, two) channels 84 through the cup shaped structure 85 allow for the fluidic medium 83 to enter/exit the cavity 82 from/to a fluid reservoir (not shown). When the fluidic pressure inside the cavity 82 changes, the curvature of the membrane 81, and therefore the lens shape, changes as well, producing different focal distances. Using an elastic silicone-based material (e.g., PDMS) of low Young's modulus (e.g., 1 M Pascals) as the membrane 81, a large lens shape change can be achieved and even a lens type change can be achieved (e.g., from a concave or flat surface to a convex surface and vice-versa) as the pressure inside the lens chamber varies (e.g., from a negative to a positive value relative to the pressure outside the chamber). To achieve an even broader tuning range of focal distance, one can use a high index fluid as the lens medium. Over the spectral range of visible light, highly transparent fluid having a refractive index of 1.68 is commercially available.

Figure 10:
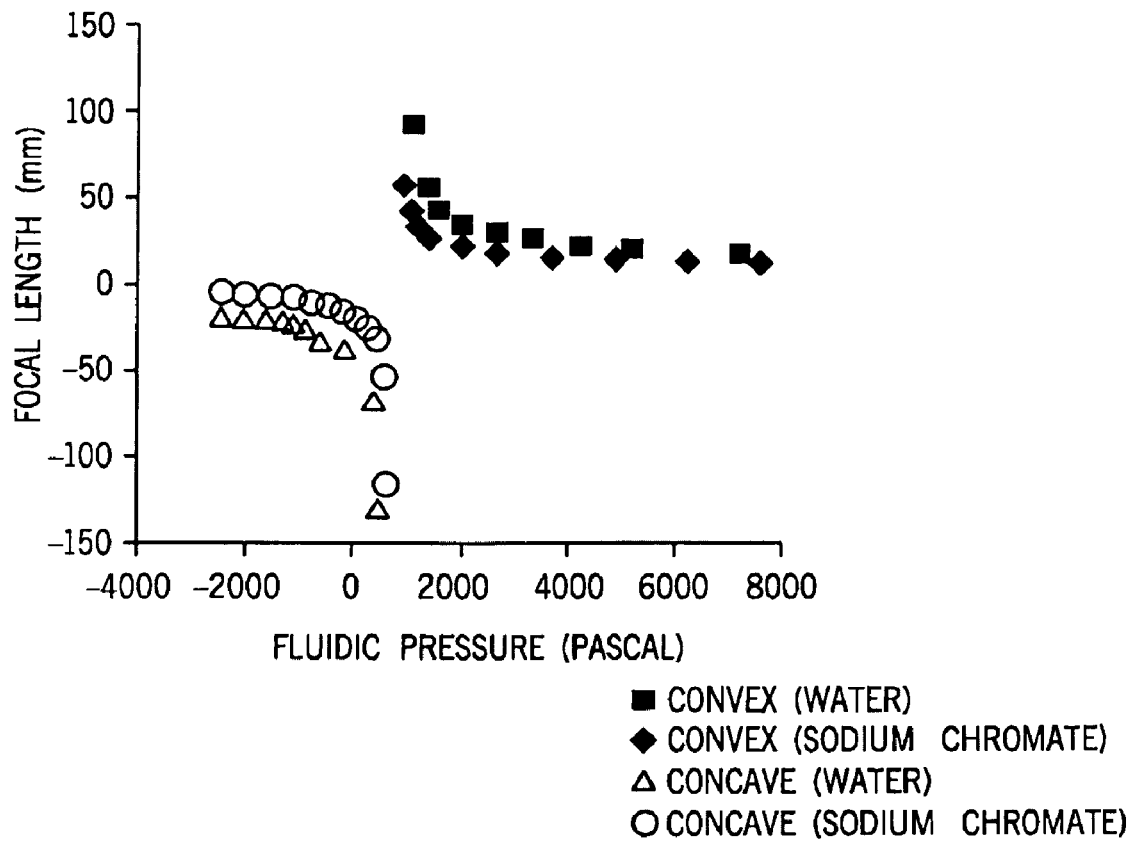
FIG. 10 is a graph showing how a focal length of the fluidic adaptive lens of FIG. 9 varies with fluidic pressure in one embodiment.

FIG. 10 shows exemplary dependence of the focal distance f of the lens 75 on the fluidic pressure with different lens media, namely, deionized water (n=1.33) and sodium chromate (n=1.50), assuming a 20 mm lens aperture. As shown, not only can the focal distance of the lens 75 be varied by modifying the fluidic pressure, but also the type of lens (e.g., concave/negative or convex/positive) as indicated by negative or positive focal distance values can be changed by modifying the fluidic pressure. It is noteworthy that minimal focal distances (20 mm for H2O and 14 mm for sodium chromate in a positive lens and −17 mm for H2O and −6 mm for sodium chromate in a negative lens) shorter than the lens aperture are demonstrated. As the previous analysis indicates, the use of one or more fluidic adaptive lenses having both wide focal distance tuning ranges and lens type convertibility makes it possible to achieve a high performance zoom system without the need for varying the lens spacing between the lenses.

Figure 11A:
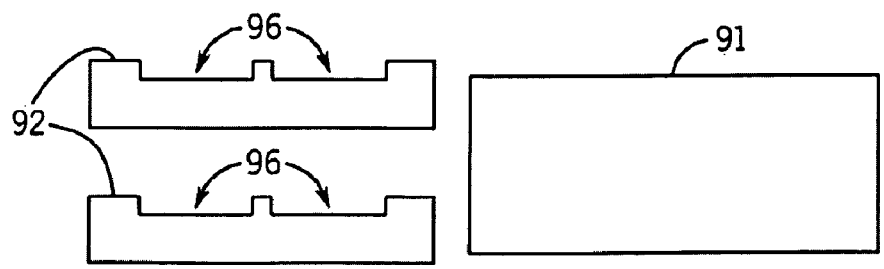
FIGS. 11a-11d show in schematic form steps of an exemplary process for constructing a lens structure utilizing fluidic adaptive lenses that can be employed in a zoom lens system.
Figure 11B:
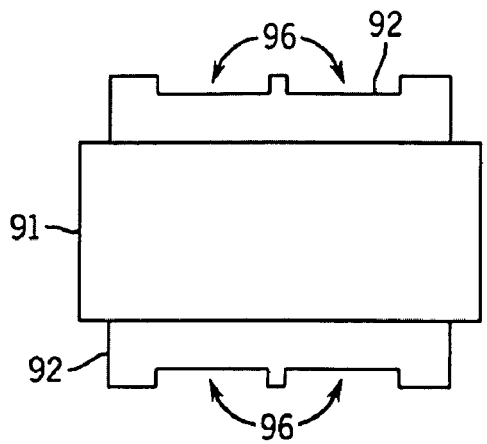

The flexibility in the choice of the materials from which the lenses 72 and other components of the zoom system 78 can be built, and particularly the flexibility in the choice of materials that can be used to form the medium 76, offers many possibilities for forming "integrated zoom lenses" and for wafer scale production of lenses and lens arrays for zoom systems. FIGS. 11a-11d show schematically how an exemplary two-lens structure 90 capable of being employed within the two-lens optical zoom system 78 could be fabricated at low cost in an exemplary wafer-scaled batch process. As shown in FIG. 11a, a transparent substrate (e.g., a glass substrate or polymer substrate) 91 of proper thickness is chosen and two wafers 92 patterned with respective cavities 96 are fabricated first. The patterns defining the cavities 96 can be formed using a soft lithography process (as discussed above with reference to FIG. 7) or a molding process. Then, as shown in FIG. 11b, the two wafers 92 are bonded to opposing sides of the substrate 91 in a manner such that the cavities 96 are open outward away from the substrate. Although each of the wafers 92 is shown as including two cavities 96, the wafers could also have one cavity or more than two cavities depending upon the embodiment.

Figure 11C:
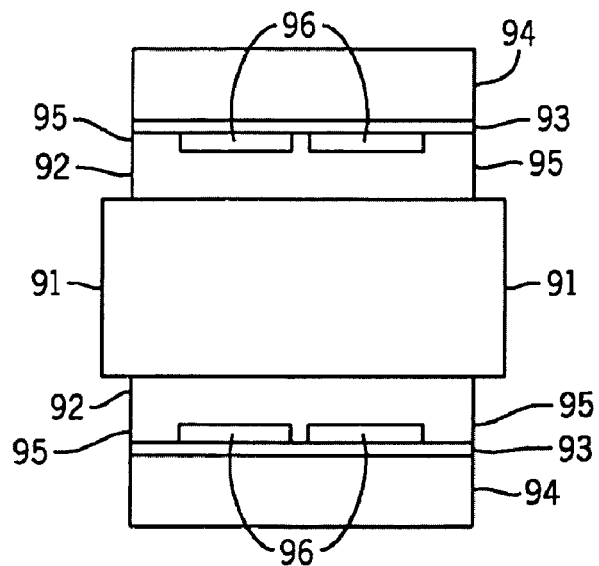
Figure 11D:
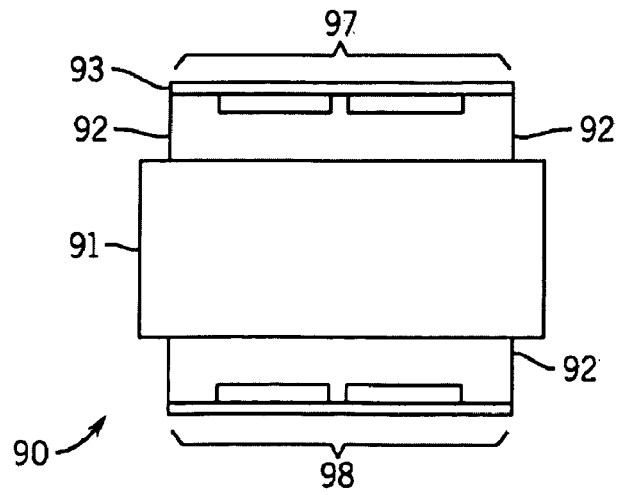

Further, as shown in FIG. 11c, two handle wafers 94 each with a respective membrane 93 deposited along a side thereof are provided. The handle wafers 94 provide mechanical support for bonding the membranes 93 onto rims 95 (as well as, in this embodiment, onto intermediate points, within the cavities 96) of the wafers 92. The bonding process can involve oxygen plasma surface activation (as discussed above with reference to FIG. 7) or other appropriate processes. Finally, as shown in FIG. 11d, the handle wafers 94 are removed from the membranes 93, leaving the completed two-lens structure 90, which includes a first fluidic adaptive lens body 97 capable of facing an object and a second fluidic adaptive lens body 98 capable of facing an imaging plane. Where multiple such two-lens structures 90 are created simultaneously on a single wafer (e.g., a single wafer comprising several of the substrates 91) by way of a batch process, such two-lens structures can be separated from one another by dicing the wafer into individual two-lens structures. Once an individual two-lens structure 90 is obtained, it can be employed in the two-lens optical zoom system 78 by connecting the two-lens structure 90 to a fluidic system (e.g., to fluidic reservoirs and actuating components such as those shown in FIG. 6), and filling the cavities 96 with the lens media of choice. Although channels allowing for fluidic media inflow/outflow with respect to the cavities 96 are not shown in FIGS. 11a-11d, it is to be understood that such channels are provided (e.g., as slots or indentations in the rims 95 of the wafers 92).

Of significance during the process shown in FIGS. 11a-11d is that there be good alignment between the cavities 96 used to form the first and second fluidic adaptive lens bodies 97, 98. Because all of the materials of the two-lens structure 90 are transparent and the patterns are formed on large sized wafers, one can use either a contact aligner or the Standard fixture of bonding machines (e.g., bonding machines produced by Karl Suss America, Inc. of Waterbury Center, Vt.) to routinely achieve an alignment accuracy of a few micrometers. Assuming proper alignment of the cavities 96, the lens membranes 93 deposited on the silicon handle wafers 94 can be bonded to the lens chambers with less alignment-concern. The process, discussed here allows fabrication of zoom lenses of nearly any size (e.g., from <0.1 mm to centimeters) for various applications.

By way of this process shown in FIGS. 11a-11d, two-lens optical zoom systems can be achieved on a high volume, low cost manufacturing basis. However, certain embodiments of the present invention are also intended to encompass a variety of other structures and fabrication processes than those shown in FIGS. 11a-11d that can be used to create zoom systems that utilize one or more fluidic adaptive lenses. Through the manufacture of such various structures by way of such various techniques, a variety of different fluidic lens structures other than the structures 90 can be obtained in order to meet different application requirements. For example, while the two-lens structure 90 of FIGS. 11a-11d would be adequate for some applications, it would nevertheless be (as in the case of the lenses 36, 46 of FIGS. 4a-4b) insufficiently robust for other applications due to the exposure of the membranes 93 to the outside environment. In contrast, FIGS. 12-17 show additional exemplary lens structures that can be attractive for implementation in devices where, to improve the robustness of the zoom systems, it is desirable that the lens membranes not be directly exposed to the outside environment or, even further, desirable that all lens membranes be contained within the inside body of the zoom system.

Figure 12:
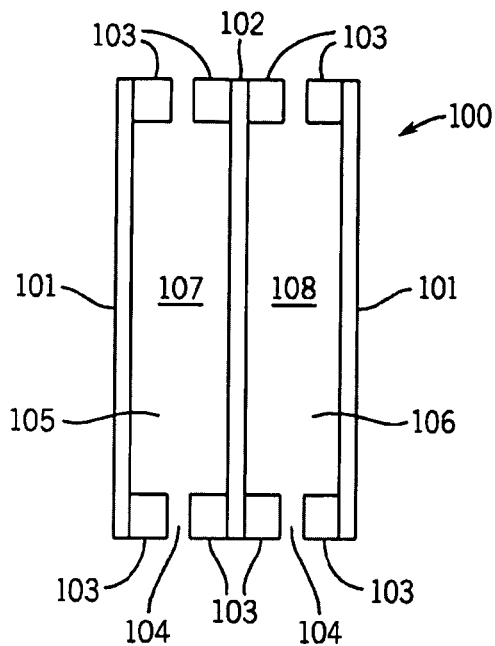
FIGS. 12, 13a and 13b show three cross-sectional views of other exemplary embodiments of lens structures.
Figure 13A:
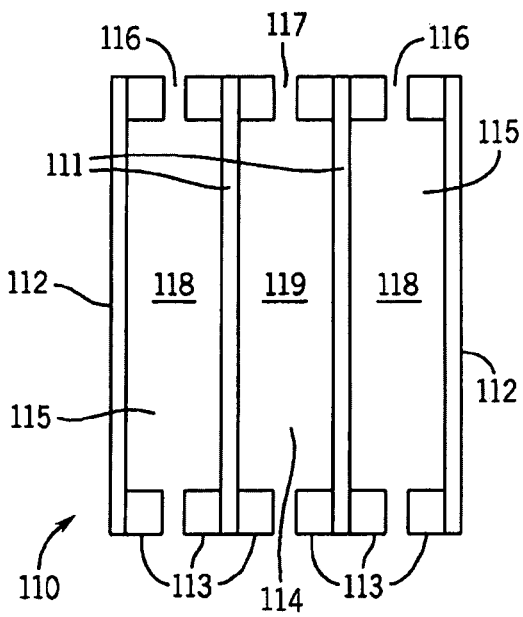
Figure 13B:
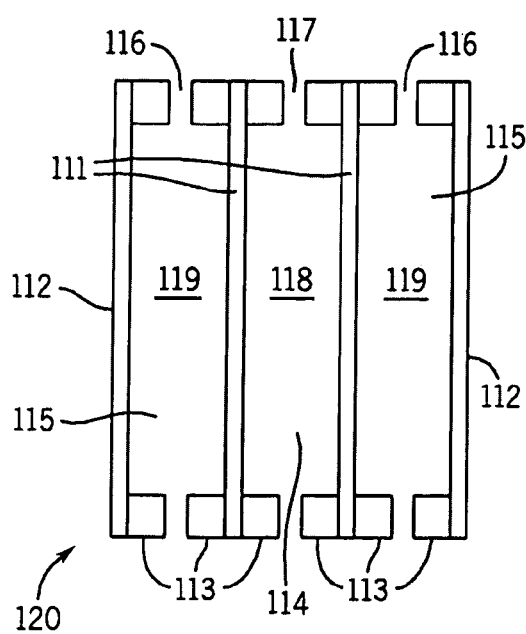
Figure 14A:
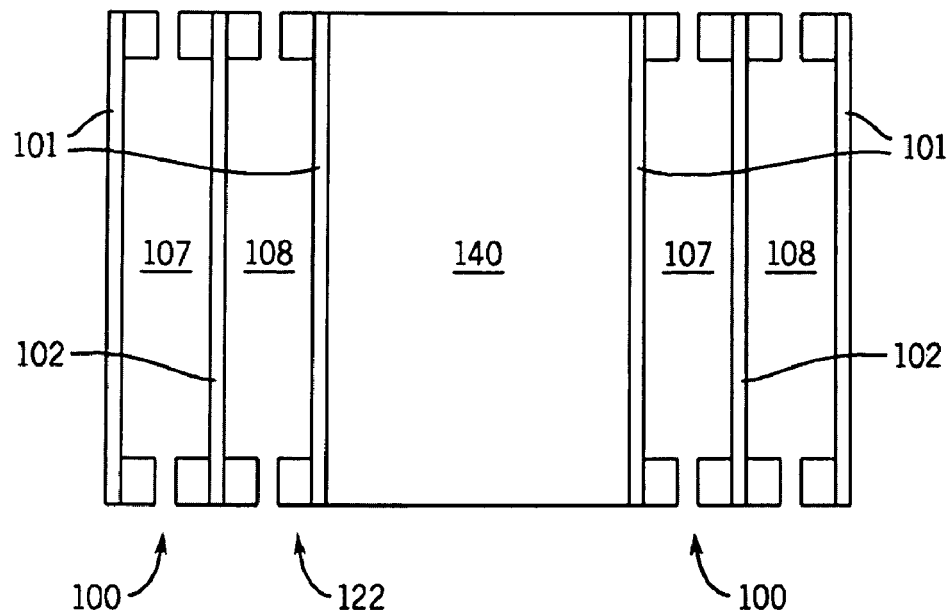
FIGS. 14a-14b, 15a-15c and 16a-16d show cross-sectional views of exemplary embodiments of two-lens structures formed form various combinations of the lens structure shown in FIGS. 12, 13a and 13b.
Figure 14B:
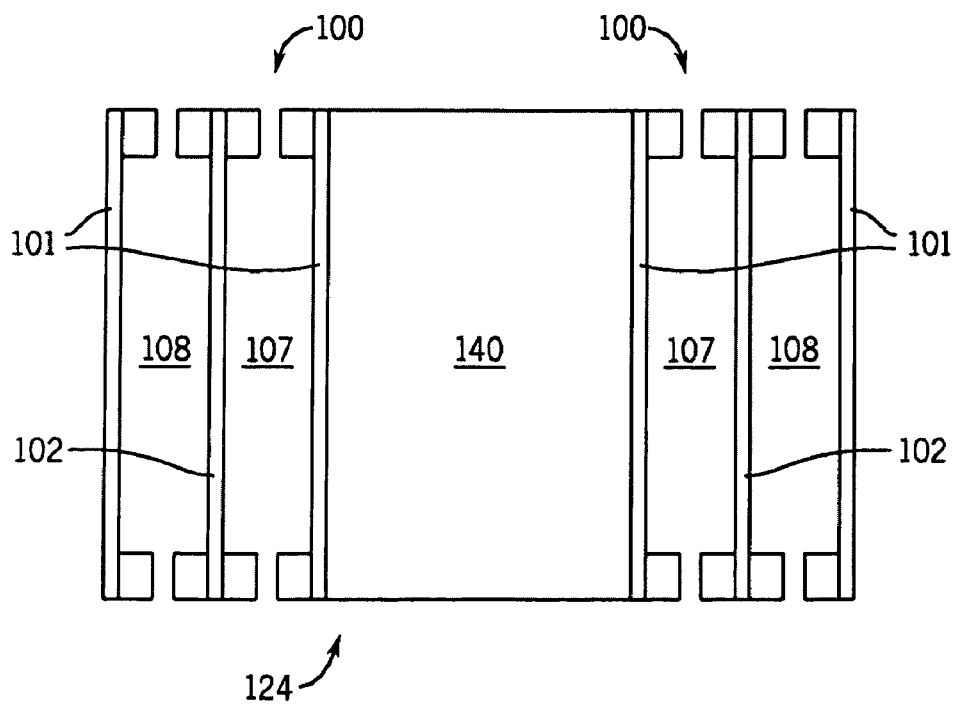

FIG. 12, 13a and 13b show additional fluidic adaptive lens structures 100, 110 and 120 that can be employed as either of the lenses 72, 74 for constructing two-lens optical zoom systems with better mechanical robustness than that afforded by the structure 90 of FIGS. 11a-11d. FIG. 11 in particular shows the lens structure 100 to include two outer surfaces 101 formed from a rigid material, a flexible membrane 102 positioned in between the outer surfaces 101 and supported therebetween by way of rigid walls 103. The outer surfaces 101, membrane 102 and walls 103 surround and define first and second internal cavities 105 and 106, respectively. The walls 103 also include fluidic channels 104 by which the first and second internal cavities 105, 106 formed between the outer surfaces 101 and the membrane 102 can be coupled to respective fluidic reservoirs (or possibly the same reservoir) and actuation components (not shown). The fluidic reservoirs provide first and second fluidic media 107, 108, respectively, to the respective cavities 105, 106. The first fluidic medium 107 typically (though not necessarily) differs in refractive index from the second fluidic medium 108, for example, the first fluidic medium can have a lower refractive index than the second fluidic medium.

As for the lens structures 110 and 120 of FIGS. 13a and 13b, each of these lens structures includes a pair of flexible membranes 111 positioned in between a pair of rigid outer surfaces 112 and supported therebetween by way of walls 113. In between the flexible membranes 111 is defined an inner cavity 114, while in between each of the membranes and the corresponding neighboring one of the rigid outer surfaces 112 is defined a respective outer cavity 115. The walls 113 contain inner and outer channels 116, 117 that respectively allow for fluidic media to enter/exit with respect to the inner cavity 114 and the outer cavities 115, respectively. Typically, though not necessarily, the outer cavities 115 receive the same fluidic medium while the inner cavity 114 receives a fluidic medium different from that provided to the outer cavities 115. In the lens structure 110 of FIG. 13a in particular, a first fluidic medium 118 of lower refractive index is provided to the outer cavities 115, while a second fluidic medium 119 of higher refractive index is provided to the inner cavity 114. In the lens structure 120 of FIG. 13b, in contrast, the first fluidic medium 118 of lower refractive index is provided to the inner cavity 114 while the second fluidic medium 119 of higher refractive index is provided to the outer cavities 115.

The fluidic adaptive lens structures 100, 110 and 120 shown in FIGS. 12, 13a and 13b each contain two media separated by one or two membranes deformable by the pressure difference between the medium-containing cavities. For example, if the pressure in the higher refractive index medium cavity is greater than that in the lower refractive index medium cavity, the membrane will bend towards the lower refractive index side to form an effective convex lens. Conversely, if a higher fluidic pressure exists in the lower refractive index medium cavity, the membrane will bend towards the higher refractive index side to form an effective concave lens. Thus, both the types of the fluidic adaptive lens structures (either negative or positive) as well as the focal lengths of the fluidic adaptive lens structures can be modified/tuned via dynamic control of the curvatures of the membranes of the lens structures, which are determined by the fluidic pressure differences between the two cavities on opposite sides of the membranes (and possibly the characteristics of the membranes themselves). In the case of the lens structures 110 and 120, the curvatures of the membranes are to some extent determined by the fluidic pressures in each of the three cavities rather than merely two of those cavities.

As discussed above, because the lens structures 100, 110 and 120 of FIGS. 12, 11a and 11b have outer surfaces 101 and 112 that are rigid, the structures are more resilient to outside disturbances. It also makes the fabrication process easier if these surfaces need to be anti-reflection coated to suppress undesirable light reflection. Further, because the outer surfaces 101, 112 are rigid, the external shapes of the lens structures do not change even though the magnitudes and signs of the pressure differences between the cavities 105, 106, 114 and 115 changes. Consequently, such lens structures 100, 110 and 120 can be easily concatenated to form two-lens optical zoom systems such as the zoom system 78 as well as multiple-lens optical zoom systems (having more than two lenses) to achieve further increases in the zoom ratio. The pressure of each fluidic chamber/cavity can be controlled by mechanical, piezo-electric, electromagnetic, electromechanical, or other actuators, such as those discussed above, and the curvature of each membrane is determined by the pressure difference between the two adjacent chambers and the mechanical properties of the membrane (although, where a given lens has three chambers, the membranes' positions can be influenced by the pressures in all three chambers). While various liquids can be employed as the fluidic media 107, 108, 118, 119, it should be understood from the above discussion that air (or some other gas) can also be used as the low index medium. In the special case where air is used, a single-cavity fluidic adaptive lens can be constructed by removing the cavities(s) for the lower refractive index medium.

FIGS. 14a-14b, 15a-15c and 16a-16d show exemplary two-lens structures 122, 124, 126, 128, 130, 132, 134, 136 and 138 constructed with various pairs of the fluidic adaptive lens structures 100, 110 and 120 discussed with respect to FIGS. 12, 13a and 13b. As shown, each of the two-lens structures 122-138 includes a pair of the lens structures 100, 110 or 120 that are separated by an intermediate optical medium 140 that is positioned between the pair of lens structures. The optical medium 140 can take on a variety of forms, including forms such as those discussed above with respect to the substrate 91 of FIGS. 11a-11d, and the medium can offer structural support for holding the pairs of lens structures together as well as simply provide a transparent, optically conductive medium. More particularly, the two-lens structures 122-138 combine the lens structures 100, 110 and 120 as follows. With respect to the two-lens structure 122 of FIG. 12a, this structure combines two of the lens structures 100 having the same orientation, such that the second fluidic medium 108 of one of the lens structures is positioned closer to the optically conductive medium 140 while the first fluidic medium 107 of the other of the lens structures is positioned closer to the optically conductive medium. As for the two-lens structure 124 of FIG. 14b, this structure combines two of the lens structures 100 in an oppositely-oriented manner, such that the same fluidic medium (in the example shown, the first fluidic medium 107) of each of the lens structures 100 is positioned closer to the optically conductive medium 140.

Figure 15A:
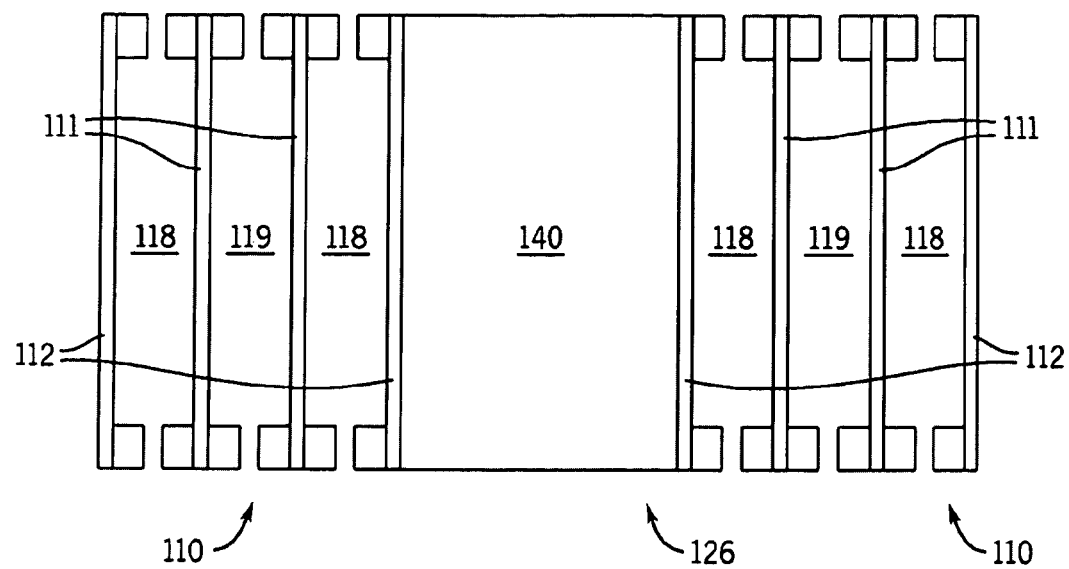
Figure 15B:
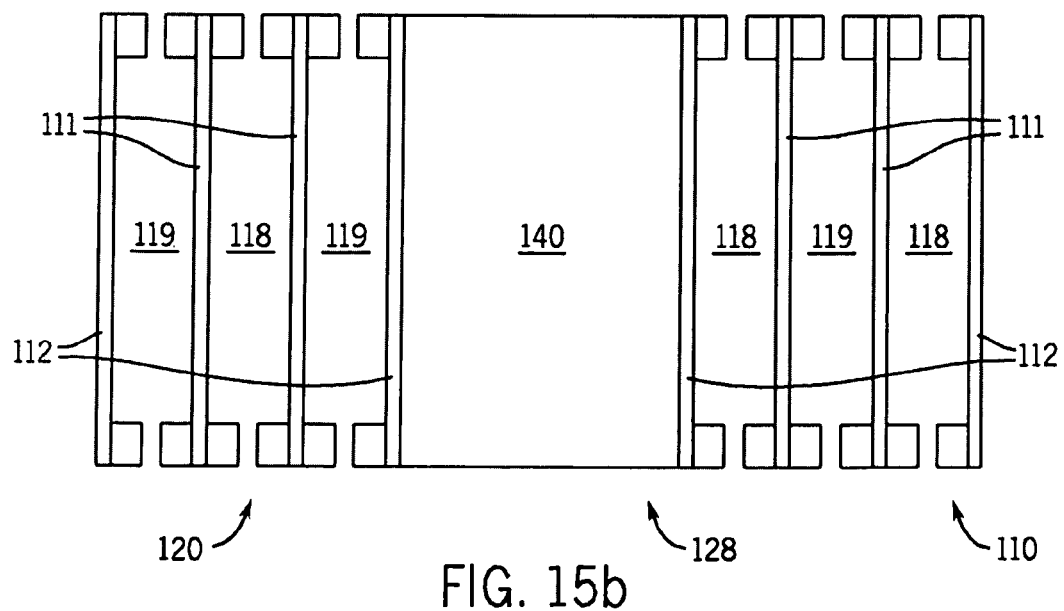
Figure 15C:
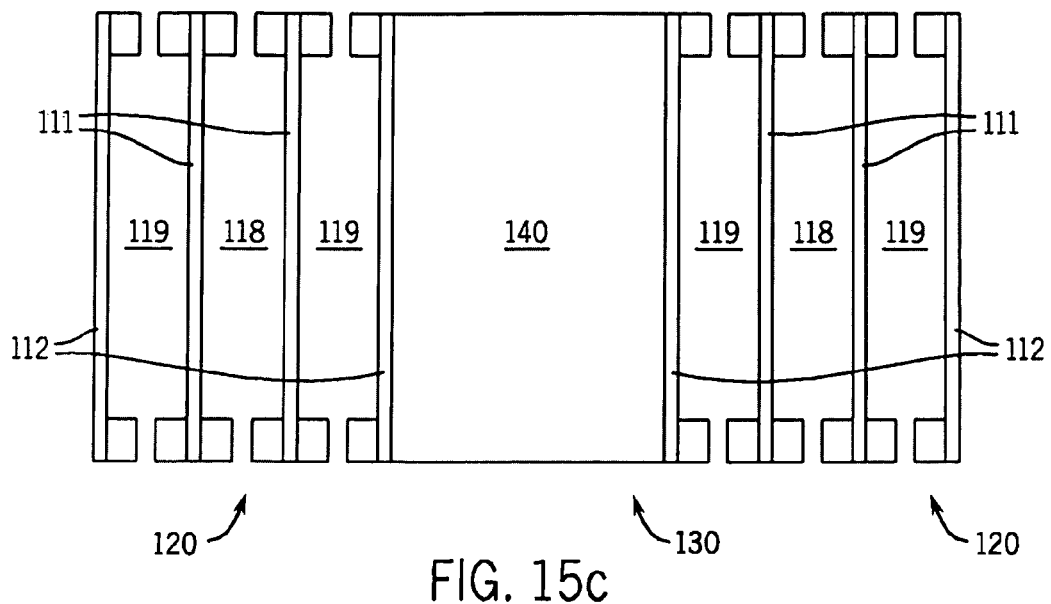
Figure 16A:
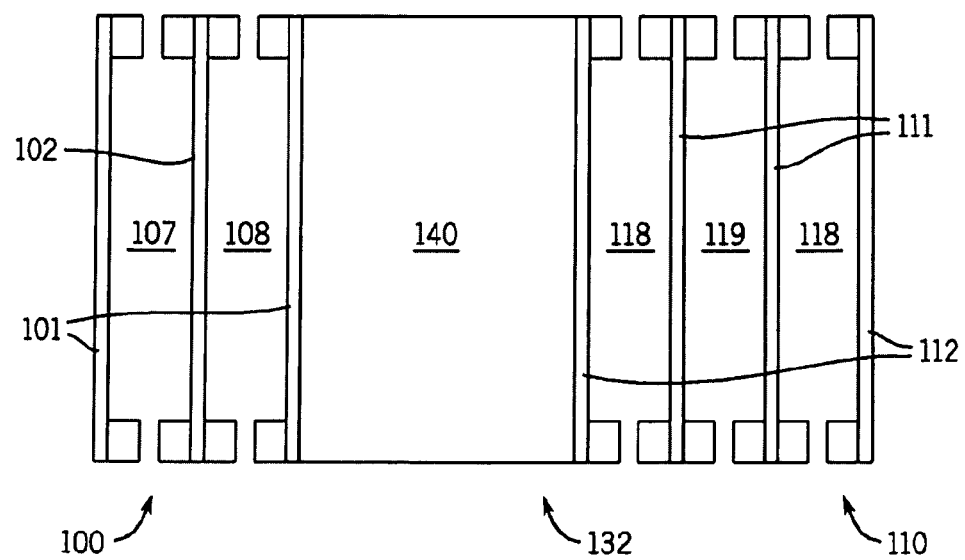
Figure 16B:
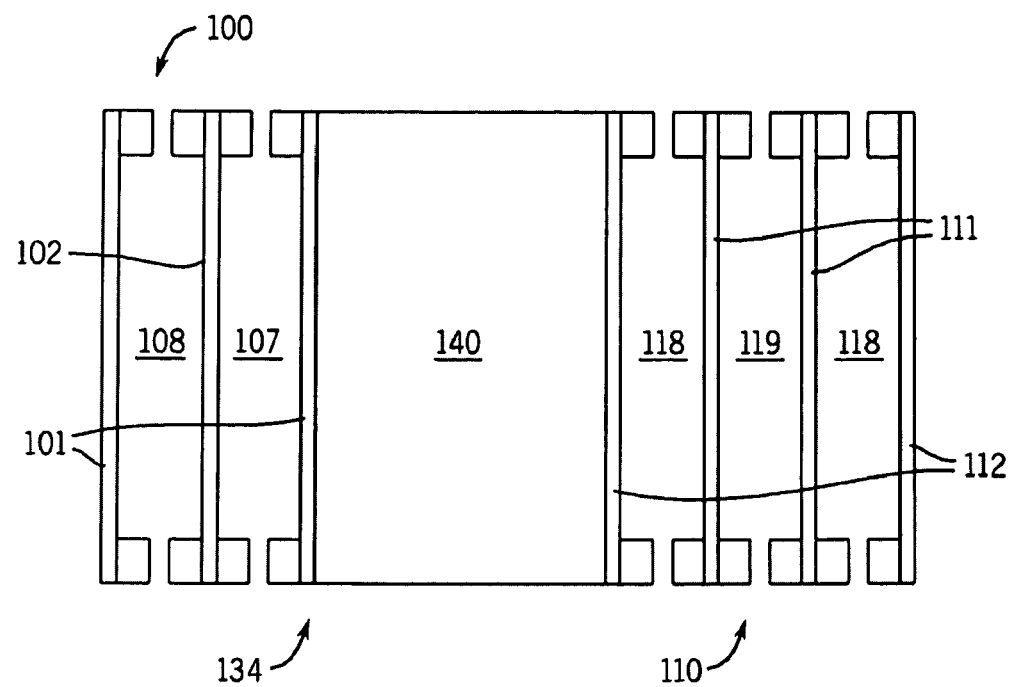
Figure 16C:
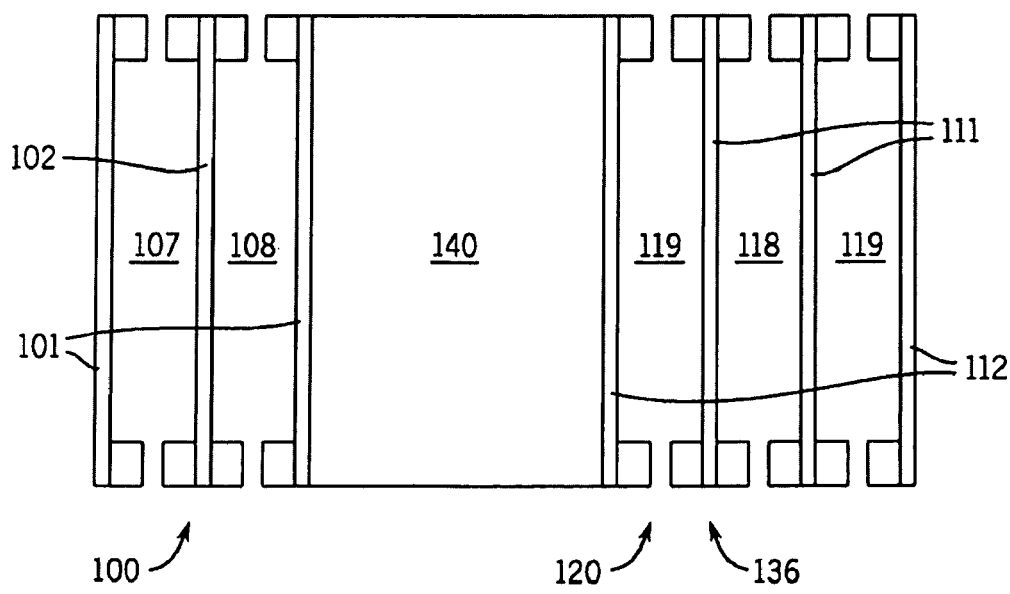
Figure 16D:
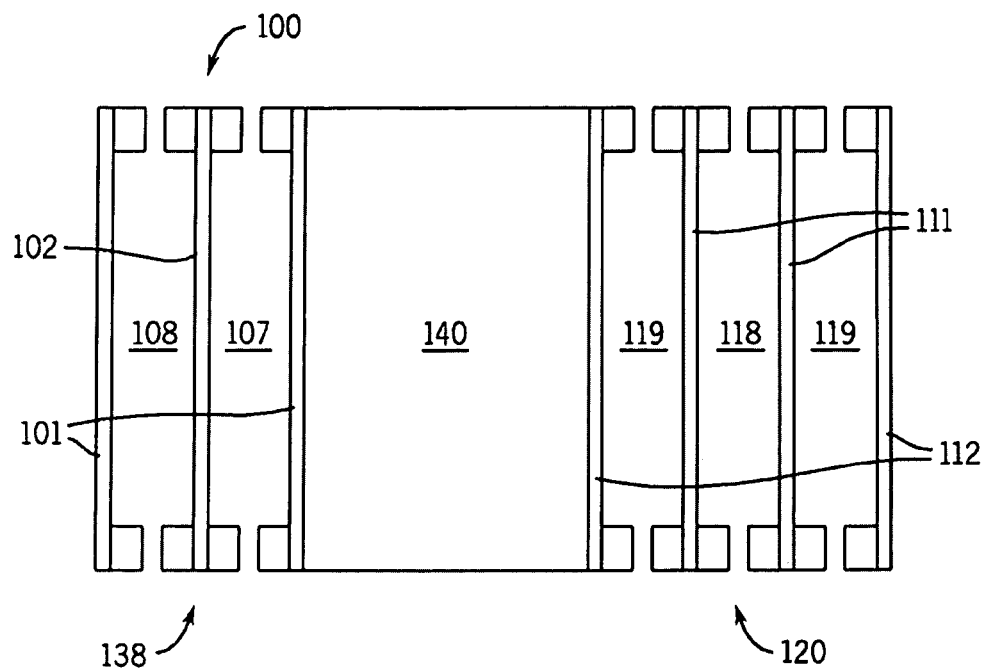

With respect to the two-lens structures 126, 128 and 130 of FIGS. 15a, 15b and 15c, respectively, these structures respectively combine two of the lens structures 110 of FIG. 13a, one of the lens structures 110 of FIG. 13a along with one of the lens structures 120 of FIG. 13b, and two of the lens structures 120 of FIG. 13b. With respect to the two-lens structures 132 and 134 of FIGS. 16a and 16b, respectively, these structures each combine the lens structure 100 of FIG. 12 with one of the lens structures 110 of FIG. 13a, where FIG. 16a shows the lens structure 100 in one orientation and FIG. 16b shows the lens structure 100 in an orientation opposite to that of FIG. 16a. As for the two-lens structures 136 and 138 of FIGS. 16c and 16d, respectively, these structures respectively combine the lens structure 100 of FIG. 12 with one of the lens structures 120 of FIG. 13b, where FIG. 16c shows the lens structure 100 in one orientation and FIG. 16d shows the lens structure 100 in an orientation opposite to that of FIG. 16c. FIGS. 14a-14b, 15a-15c and 16a-16d are only intended to show some exemplary arrangements of the fluidic adaptive lens structures 100, 110, 120 to form exemplary two-lens structures that can be implemented in two-lens optical zoom systems such as the system 78 discussed above, and other arrangements of these and other fluidic adaptive lens structures are intended to be encompassed within certain embodiments of the present invention.

Figure 17:
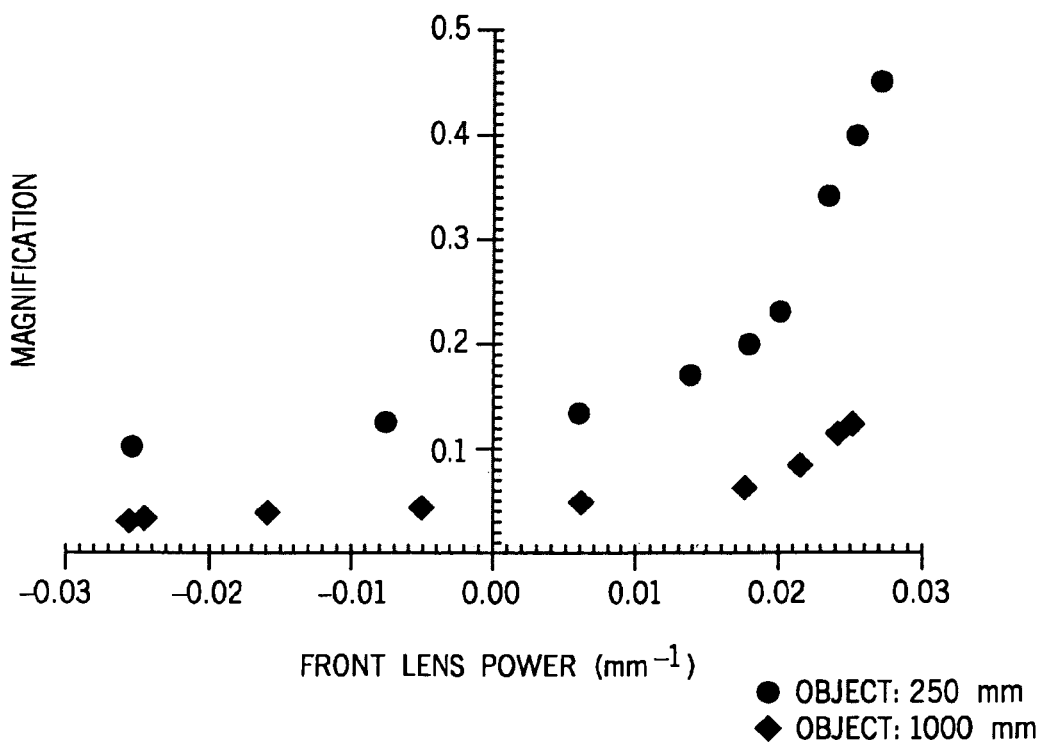
FIG. 17 is a graph showing the variation of magnification provided by an exemplary zoom lens system, in accordance with one of the embodiments of FIGS. 14-16, as a function of front lens power.

Turning to FIG. 17, performance characteristics of a functional fluidic adaptive lens optical zoom system designed and fabricated according to the process discussed above with reference to FIGS. 11a-11d are shown. The system employs water as the high index medium, and has a 20 mm aperture and an image distance of 50 mm. As shown, at an image distance of 50 mm, the ratio of the maximal to minimal magnification factor is 4.6 and 4.2 for object distances of 250 mm and 1000 mm, respectively. This yields a zoom ratio of greater than 3.

More generally, to estimate the zoom ratio of the zoom system, one can calculate zoom lenses with 3 mm and 1 mm apertures assuming water (n=1.333) as the high index medium and air as the low index medium. For a 3 mm aperture zoom system with a lens spacing (d) of 8 mm and an image plane distance of 5 mm, one obtains a zoom ratio of greater than 4:1. Such a zoom system has a maximal field of view (FoV) of around 45 degrees. For a 1 mm aperture zoom system with a lens spacing of 8 mm and an image plane distance of 1.5 mm, one obtains a zoom ratio of greater than 5:1. The maximal field of view for such a zoom lens is about 17 degrees. If desired, one can obtain a zoom ratio of greater than 10:1 at the expense of the field of view, assuming a lens spacing of 8 mm and an image plane distance of 5 mm. Finally, since the tunable lenses possess a shape of a spherical surface of a tunable radius of curvature, it produces about the same amount of aberration as solid-state spherical lenses. Such aberration can be corrected with one or more aspherical surfaces, a practice widely used by the optical system design community.

Figure 18:
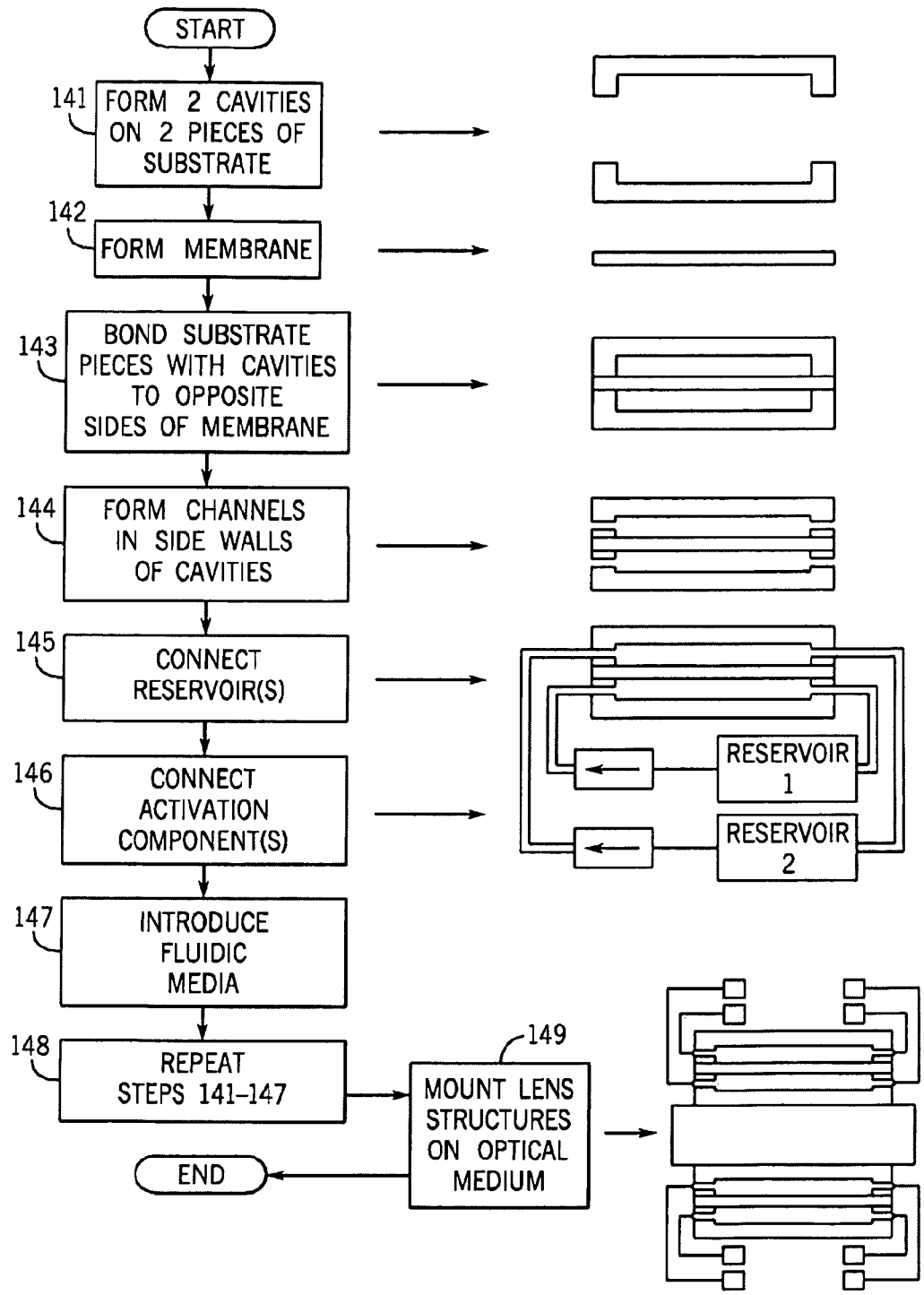
FIG. 18 is a simplified flow chart showing exemplary steps of a procedure for creating a two-lens structure such as those shown in FIGS. 14a-14b.

Although the fabrication process shown with reference to FIGS. 11a-11d is not exactly applicable to the construction of the lens structures 100, 110 and 120 shown in FIGS. 12, 13a and 13b or to the fabrication of the two-lens structures shown in FIGS. 14a-14b, 15a-15c, and 16a-16d, a number of fabrication processes for such lens structures are possible. For example, FIG. 18 provides a flow chart 140 showing one exemplary process for constructing the lens structures 100 and one of the two-lens structures 122 making use of a pair of those lens structures 100. Upon starting the process, in a first step 141, cavities are formed on two separate pieces of transparent substrate. The diameter of the cavities can vary from a few hundred micrometers to a few centimeters depending on the application, and the thickness (depth) of the cavities could be in the range of a few hundred micrometers to a few millimeters. In a second step 142, a thin polymer membrane is formed. The membrane thickness typically is in the range of tens of micrometers to 100 µm and the membrane behaves elastically under stress, such that it can be used as a flexible diaphragm separating the cavities to be filled with media of different indices of refraction.

Next, in a third step 143, opposite sides of the polymer membrane formed in the second step are respectively bonded to the respective pieces of substrate with the cavities formed in the first step to form two closed cavities, one on either side of the membrane. Then, in a fourth step 144, one or more channels are formed in the side walls of each of the cavities to provide inlets/outlets for the fluidic media (in some embodiments, a given channel or hole can act as both an inlet and an outlet, while in other embodiments, dedicated channels are provided specifically as either inlets or outlets). Then, in a fifth step 145, the inlets and outlets are coupled to one or more fluid reservoirs (typically, in this case, first and second reservoirs for first and second fluidic media). Further, in a sixth step 146, one or more actuation components are incorporated to control the flow of the fluidic media into and out of the cavities (e.g., by varying the pressures of the fluidic media). As discussed above, these actuation components can take on any of a number of forms including, for example, fluidic micropumps, piezoelectric actuators, micro-electro-mechanic-system (MEMS) actuators, teflon-coated set screws, or other forms of actuation components, to control and set the pressure of each fluid chamber.

Next, in a seventh step 147, two fluidic media of different refractive indices are provided into the respective cavities. For example, one of the media can be water having an index of 1.3 and the other medium can be oil having a refractive index of about 1.6 (in alternate embodiments, the fluidic media can have the same refractive index). This completes the construction of one of the lens structures 100. To form the two-lens structure 122, steps 141-147 would be repeated a second time, shown as an eighth step 148, to generate a second of the lens structures 100. Once two of the lens structures 100 have been fabricated, the two lens structures at a ninth step 149 can then be mounted to an optical medium constituting the optical medium 140 between the two structures as shown in, for example, FIGS. 13a and 13b. As noted above, the optical medium can be, for example, a solid transparent substrate of certain thickness (e.g. a glass wafer or a polymer substrate). Thus, the process of forming one of the two-lens structures 122, 124 of FIGS. 14a and 14b would be complete.

Other processes for fabricating the lens structure 100 of FIG. 12 as well as the lens structures 110 and 120 of FIGS. 13a-13b are also possible, as are other processes for fabricating the two-lens structures 122-138 of FIGS. 14a-14b, 15a-15c and 16a-16d. Once constructed, the entire optical zoom systems using the two-lens structures can take the form of cylindrical tubes of a few millimeters in diameter and about one centimeter long. Such devices can be conveniently attached to many handheld or pocket-sized devices. To the extent that a zoom system can be made into a compact attachment capable of being retrofit to commercial optical systems, many additional products such as eyeglasses or goggles with zooming functions are possible.

As discussed above, various embodiments of the present invention can include and/or be implemented in a variety of devices and systems used for a variety of applications and purposes. At least some embodiments of the present invention relate to the use of fluidic lenses that are intended for use in applications that involve the transmission of visible light. In at least some such embodiments, as discussed above, the fluidic lens contains fluid that is partially transparent over a spectral width of at least 200 nm. Additionally, at least some further embodiments of the present invention relate to the use of fluidic lenses that are intended for use in applications that involve the transmission of light at other ranges other than, or in addition to, the visible spectrum. Such applications can include, for example, applications relating to security, biometric (iris, fingerprint) scanning/identification, surgical equipment, bar-code scanning, etc. In some such embodiments, light sources such as lasers or LEDs can be employed to illuminate objects that are to be viewed via the fluidic lenses and, since such light sources often generate light that is concentrated within relatively narrow optical spectra, in such embodiments the fluidic lenses can operate (e.g., be at least partially transparent) with respect to light within narrow spectral ranges. In at least some embodiments of the present invention, therefore, the fluidic lens can be at least partially transparent over only a spectral width of at most 200 nm, or over a spectral width of at most some width less than 200 nm.

Additionally, in some such embodiments where it is desired that the fluidic lenses transmit light at/within particular specific spectral ranges, one can develop fluidic medium(s) for such lenses that are limited to particular spectral ranges simply by adding particular dyes to the fluidic medium(s). For example, to limit transmission of light through fluidic lenses to red light (within the visible light spectrum), one can simply introduce "red ink" to the fluidic medium to make the fluidic medium transmit only red light for desired applications.

Information and implementations relevant to the present invention are additionally disclosed in U.S. patent application Ser. No. 11/683,141 entitled "Fluidic Adaptive Lens Systems and Methods" filed on Mar. 7, 2007, U.S. patent application Ser. No. 10/599,486, which is the U.S. national phase patent application of International Application No. PCT/US05/10948 entitled "Fluidic Adaptive Lens" filed on Mar. 31, 2005, and U.S. provisional application No. 60/558,293 entitled "Fluidic Adaptive Lens" filed on Mar. 31, 2004, all of which are incorporated by reference herein. Further information and implementations relevant to the present invention are disclosed in International Application No. PCT/US05/39774, entitled "Fluidic Adaptive Lens Systems with Pumping Systems," filed on Apr. 11, 2005, and U.S. provisional application Ser. No. 60/625,419, entitled "Tunable Fluidic Lenses With Integrated Micropumps" filed on Nov. 5, 2004, both of which are hereby incorporated by reference herein.

It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A lens device, comprising:
    a lens chamber including a plurality of surfaces, wherein at least one surface of the plurality of surfaces is optically transparent;
    a lens membrane coupled to the lens chamber, wherein at least a portion of the lens membrane is flexible and optically transparent, and wherein the lens membrane and the lens chamber define a first cavity;
    a fluidic medium positioned within the first cavity, the fluidic medium also being optically transparent; and
    a control device capable of controlling a parameter of the fluidic medium,
    wherein the fluidic medium is selected so as to transmit at least 20% of an optical signal over a wavelength spectrum that spans no more than 200 nm.

2. The lens device of claim 1, wherein the fluidic medium transmits light received from a light source including at least one of a laser and a light emitting diode.

3. A system comprising the lens device and light source of claim 2, wherein the system is at least one of a security system, biometric scanning or identification system, a piece of surgical equipment, and a bar-code scanning system.

4. The lens device of claim 1, wherein the fluidic medium is formed from at least one of a polyphenyl ether material and a lens oil.

5. The lens device of claim 1, wherein the fluidic medium includes lens fluid product model number LS5257.

6. The lens device of claim 1, wherein the fluidic medium is formed from thioethers benzene.

7. The lens device of claim 1, wherein the fluidic medium is formed from a medium selected from the group consisting of water, methanol, lens oil, saline, and air.

8. The lens device of claim 1, wherein the fluidic medium is selected so as to achieve an index of refraction of at least 1.3.

9. The lens device of claim 1, wherein the fluidic medium is capable of operating over a range of temperature that spans at least 30 degrees Celsius.

10. The lens device of claim 9, wherein the range of temperature includes a range from −20 degrees Celsius to 60 degrees Celsius.

11. The lens device of claim 1, wherein the fluidic medium is capable of being stored over a range of temperature that spans at least 30 degrees Celsius.

12. The lens device of claim 11, wherein the range of temperature includes a range from −40 degrees Celsius to 100 degrees Celsius.

13. The lens device of claim 1, wherein the fluidic medium is selected so as to achieve a vapor pressure of nearly zero.

14. The lens device of claim 1, wherein the fluidic medium is selected so as to achieve chemical stability with the lens membrane and the lens chamber, and wherein the lens membrane is formed from optically transparent silicone rubber.

15. A lens device, comprising:
    a lens chamber including a plurality of surfaces, wherein at least one surface of the plurality of surfaces is optically transparent;
    a lens membrane coupled to the lens chamber, wherein at least a portion of the lens membrane is flexible and optically transparent, and wherein the lens membrane and the lens chamber define a first cavity;
    a fluidic medium positioned within the first cavity, the fluidic medium also being optically transparent; and
    a control device capable of controlling a parameter of the fluidic medium,
    wherein the fluidic medium contains at least one phenyl group and has a molar molecular weight greater than 200 g.

16. The lens device of claim 15, wherein the fluidic medium is lens fluid product model number LS5257.

17. The lens device of claim 15, wherein at least one of the lens membrane and at least one surface of the lens chamber includes polydimethylsiloxane ("PDMS").

18. The lens device of claim 17, wherein the lens membrane is made from at least one of PDMS and another transparent elastomer membrane material.

19. The lens device of claim 15, wherein the fluidic medium is lens fluid product model number LS5257, and wherein at least one of the lens membrane and at least one surface of the lens chamber includes polydimethylsiloxane ("PDMS").

20. A method of fabricating a fluidic adaptive lens device, comprising:
    providing a lens chamber including a plurality of surfaces, wherein at least one surface of the plurality of surfaces is optically transparent;
    affixing a lens membrane to the lens chamber, wherein at least a portion of the lens membrane is flexible and optically transparent and wherein the lens membrane and the lens chamber define a first cavity;
    positioning a fluidic medium within the first cavity, wherein the fluidic medium is optically transparent; and
    providing a control device capable of controlling a parameter of the fluidic medium,
    wherein the fluidic medium contains at least one phenyl group and has a molar molecular weight greater than 200 g.

21. A lens device, comprising:
    a lens chamber including a plurality of surfaces, wherein at least one surface of the plurality of surfaces is optically transparent;
    a lens membrane coupled to the lens chamber, wherein at least a portion of the lens membrane is flexible and optically transparent, and wherein the lens membrane and the lens chamber define a first cavity;
    a fluidic medium positioned within the first cavity, the fluidic medium also being optically transparent; and
    a control device capable of controlling a parameter of the fluidic medium,
    wherein the fluidic medium comprises lens oil and has a molar molecular weight greater than 200 g.

22. A method of fabricating a fluidic adaptive lens device, comprising:
    providing a lens chamber including a plurality of surfaces, wherein at least one surface of the plurality of surfaces is optically transparent;
    affixing a lens membrane to the lens chamber, wherein at least a portion of the lens membrane is flexible and optically transparent and wherein the lens membrane and the lens chamber define a first cavity;
    positioning a fluidic medium within the first cavity, wherein the fluidic medium is optically transparent; and
    providing a control device capable of controlling a parameter of the fluidic medium,
    wherein the fluidic medium has a transmission level of at least 20% of an optical signal over a wavelength spectrum that spans at most 200 nm and has a molar molecular weight greater than 200 g.

23. A method of fabricating a fluidic adaptive lens device, comprising:
- providing a lens chamber including a plurality of surfaces, wherein at least one surface of the plurality of surfaces is optically transparent;
- affixing a lens membrane to the lens chamber, wherein at least a portion of the lens membrane is flexible and optically transparent and wherein the lens membrane and the lens chamber define a first cavity;
- positioning a fluidic medium within the first cavity, wherein the fluidic medium is optically transparent; and
- providing a control device capable of controlling a parameter of the fluidic medium,
- wherein the fluidic medium has a transmission level of at least 20% of an optical signal over a wavelength spectrum that spans at most 200 nm and has a molar molecular weight greater than 200 g.

24. A method of fabricating a fluidic adaptive lens device, comprising:
- providing a lens chamber including a plurality of surfaces, wherein at least one surface of the plurality of surfaces is optically transparent;
- affixing a lens membrane to the lens chamber, wherein at least a portion of the lens membrane is flexible and optically transparent and wherein the lens membrane and the lens chamber define a first cavity;
- positioning a fluidic medium within the first cavity, wherein the fluidic medium is optically transparent; and
- providing a control device capable of controlling a parameter of the fluidic medium,
- wherein the fluidic medium comprises a lens oil and has a molar molecular weight greater than 200 g.

* * * * *